United States Patent [19]

Pasturczak et al.

[11] 4,037,949
[45] July 26, 1977

[54] SLOT LOAD PROJECTOR

[75] Inventors: Vincent S. Pasturczak, Chicago; Melvin T. Kerstein, Lincolnwood, both of Ill.

[73] Assignee: Bell & Howell Company, Chicago, Ill.

[21] Appl. No.: 641,495

[22] Filed: Dec. 17, 1975

[51] Int. Cl.² .............................................. G03B 1/58
[52] U.S. Cl. ..................................... 352/158; 352/224
[58] Field of Search ................ 352/157, 158, 159, 224

[56] References Cited

U.S. PATENT DOCUMENTS

| | | | |
|---|---|---|---|
| 1,262,611 | 4/1918 | Krug | 352/157 |
| 1,973,477 | 9/1934 | Fritts | 352/157 |
| 2,033,225 | 3/1936 | Bornmann | 352/157 |
| 3,119,300 | 1/1964 | Barolela | 352/157 |
| 3,363,851 | 1/1968 | Rube | 352/157 |
| 3,492,067 | 1/1970 | Matsubara | 352/178 |
| 3,720,461 | 3/1973 | Reinsch | 352/224 |
| 3,734,602 | 5/1973 | Deck | 352/157 |
| 3,776,623 | 12/1973 | Browder | 352/124 |
| 3,848,981 | 11/1974 | Chedister | 352/157 |

Primary Examiner—Monroe H. Hayes
Attorney, Agent, or Firm—John R. Hoffman; Robert J. Schneider; Roger M. Fitz-Gerald

[57] ABSTRACT

A motion picture projector having a slot for edgewise loading of the film is provided with a film strip encapsulating and drive system which is operated by a single control lever. Operation of a control lever moves a plurality of film path forming elements to an open position so that edgewise insertion of the film into the projector automatically forms loops on either side of a film gate. Closure of the control lever encapsulates the film strip within film gate drive sprockets and around a sound drum while maintaining free loops on either side of the film gate. The actuator includes a pair of switches to shut down a drive system projection lamp and an audio amplifier when moving between an open or loading position and a closed position to prevent inadvertent damage to the film which could occur if the drive means continued in operation. A second switch connected to the projection lamp and audio amplifier maintains these units in an off position when the actuator is in an open position.

27 Claims, 17 Drawing Figures

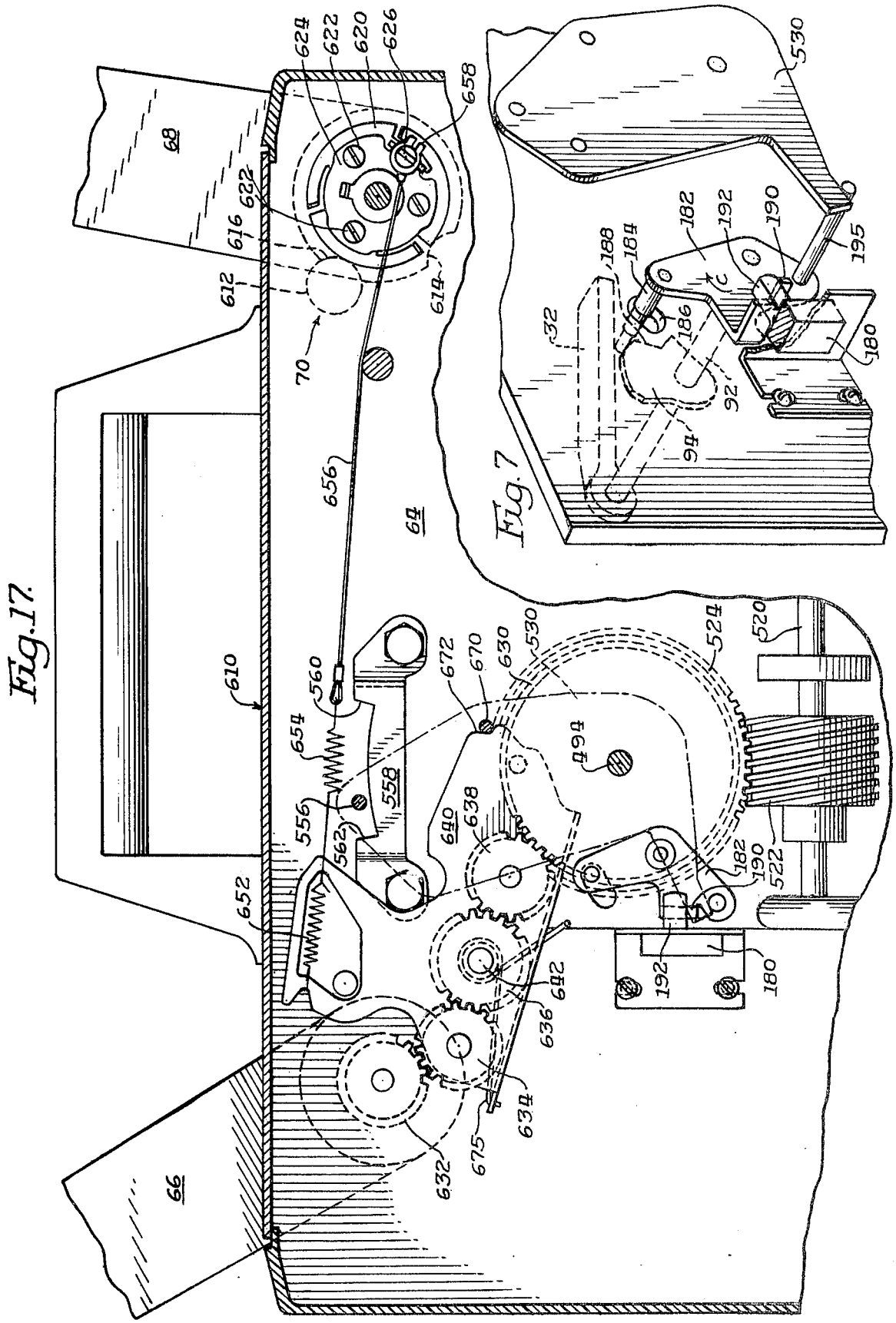

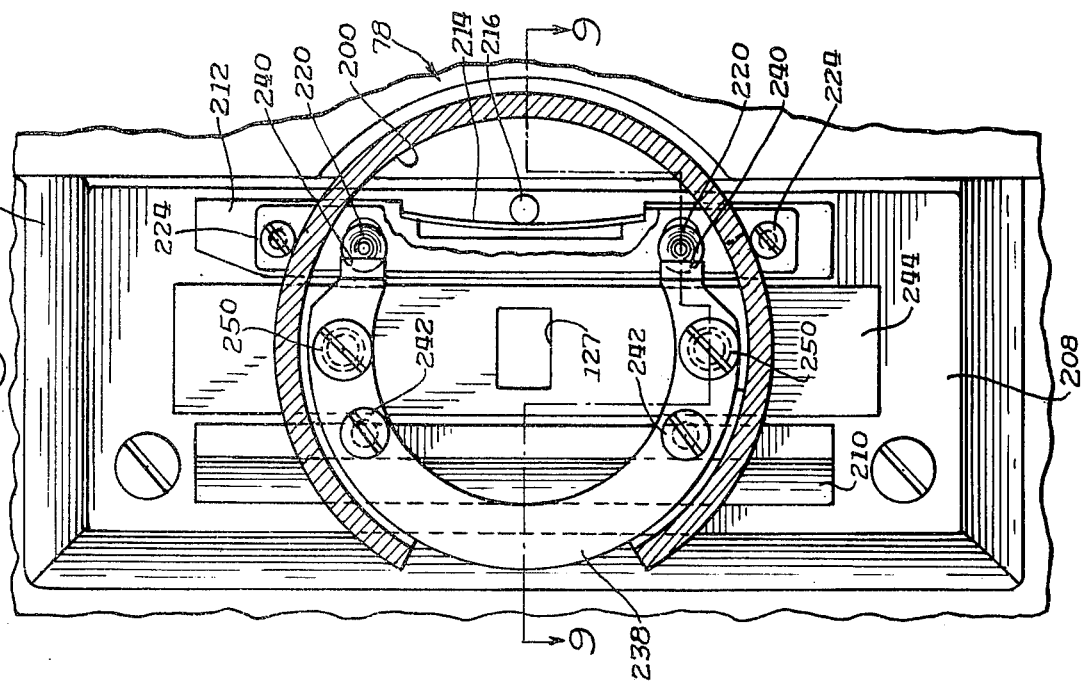
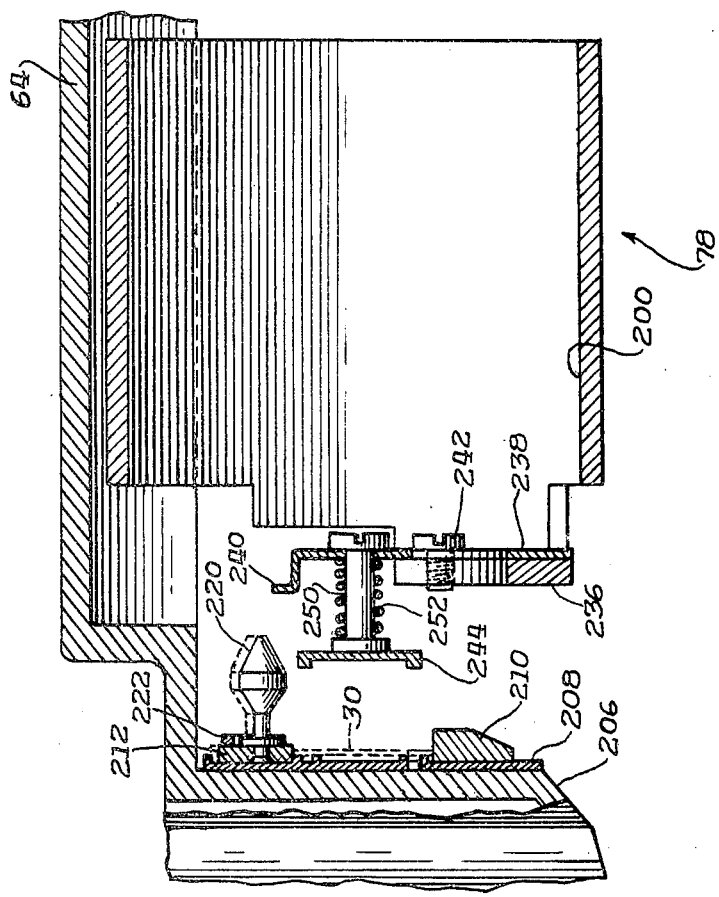

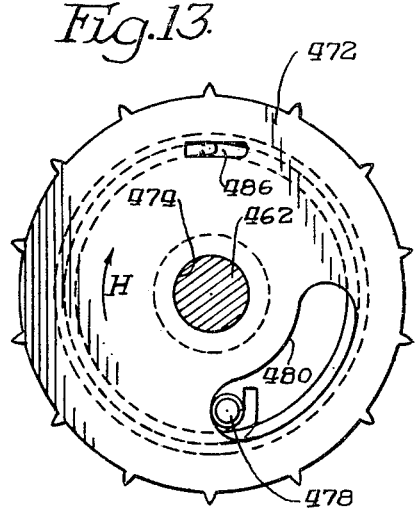
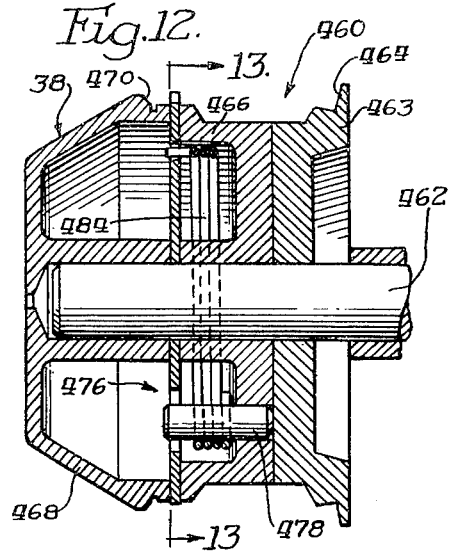
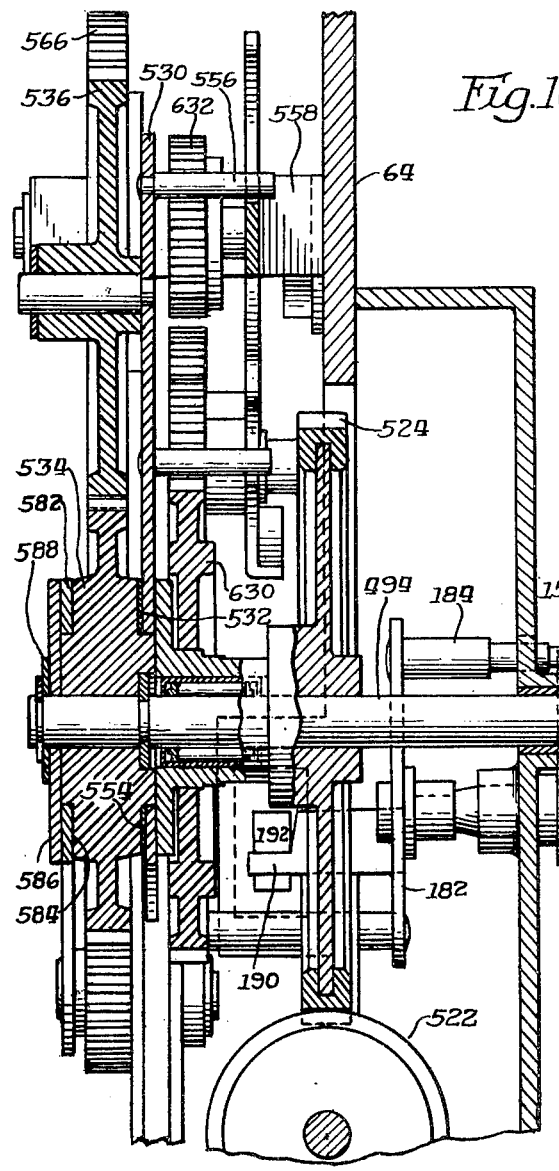
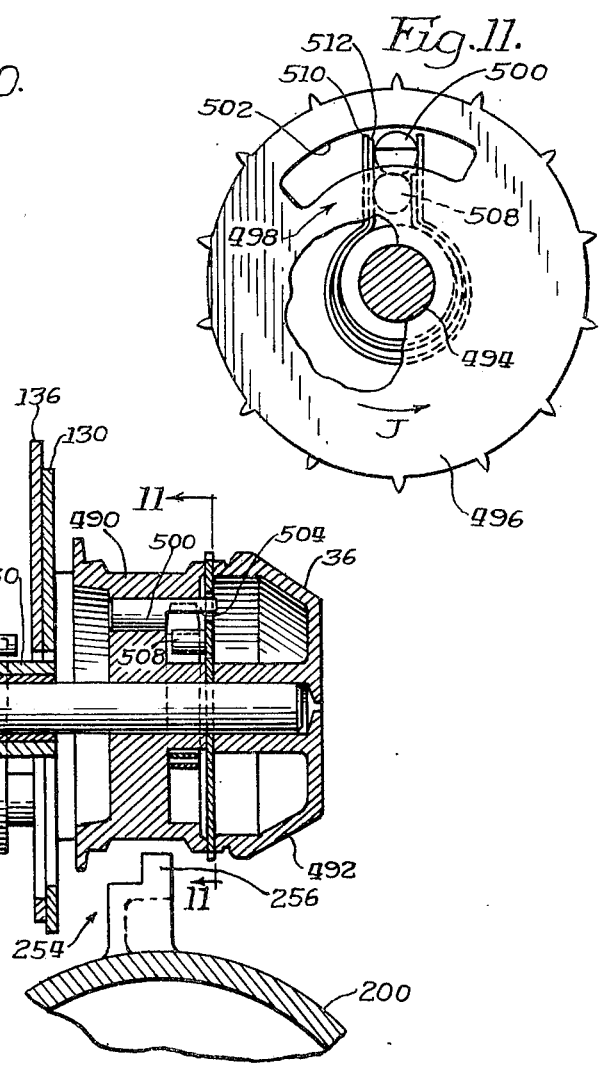

SLOT LOAD PROJECTOR

BACKGROUND OF THE INVENTION

1. Description of the Invention

This invention relates to motion picture projectors and in particular to a motion picture projector designed for edgewise loading of the film.

2. Description of the Prior Art

In the past, a great majority of the motion picture projectors that have been produced required the film to be manually "threaded", that is, passed around a number of tooth sprockets, through the film shuttle, and, in the case of a projector provided with an audio amplifier, around a sound drum, while placing the perforations in the film in mesh with the teeth of the appropriate sprockets and then closing the guide members which hold the film into contact with the sprockets. It also is necessary to manually establish loops of the correct lengths between the drive sprockets on either side of the film shuttle intermittent advancement mechanism.

In practice, it sometimes is found that threading of the film in a projector of this type is a complicated and difficult operation. If the film is threaded incorrectly, it is likely to be damaged and cause unsatisfactory performance of the projector.

In order to overcome this difficulty of manual threading of the film, many "self threading" projectors have been produced in an attempt to alleviate the above noted difficulties. In a self threading projector, the end of the film is introduced endwise into a slot which then leads it to a first tooth sprocket which engages the film perforations and drives it forward when the mechanism is in motion. The end of the film strip is guided by a series of curved members which force it to travel in succession to another part of the film drive system where it is engaged successively by various driving members and sprockets. When the leading end of the film has been carried through a complete threading path, it emerges from the mechanism and is attached to a takeup reel. In order to operate a projector of this type, it is necessary to withdraw loop forming guides so that the film loops can move freely adjacent the film shuttle.

These self threading projectors have several disadvantages. Particularly, successful engagement of the perforations in the film with each of the sprockets depends on the condition of the end of the film strip. The end of the strip must not have sharp bends near the leading end region (such as its often produced when the film is attached to a takeup reel) or the film will not properly be fed through the projector. If the film is not in good condition, it is likely to be damaged further by the first sprocket in the projector to such an extent that it will become jammed at some later point in its path.

While self threading mechanism of this type have been used with some success on motion picture projectors which do not include audio amplifiers, it is much more difficult to make the projector operate successfully when it is necessary to wrap a sound drum because of the more complicated film path required to be established about the sound drum.

Additionally, in both of the above mentioned types of projectors, once the film has been threaded into the projector, it is possible to remove the film only by running the projector until one of the ends of the film passes completely through the projector. Therefore, if it is desired to shown only a portion of a movie (e.g., a segment in the middle thereof), a substantially large amount of time is wasted as the film strip is driven through the projector until the desired beginning point is reached and likewise after the desired portion has been viewed by the user.

SUMMARY OF THE INVENTION

An object of the present invention is to provide a new, reliable, slot loading motion picture projector which is easily operated by a single control lever.

Another object of the present invention is to provide a projector of this type including multiple position guide means for guiding the film into the slot and encapsulating the film for proper projection.

In accordance with the above and other objects, the present invention provides a motion picture projector having a slot for edgewise loading of the film into the projector, a feed sprocket, a takeup sprocket, a film gate and a reversible drive means for driving the film through the projector. A multiple position guide means defines the path of travel of the film wherein the multiple position guide means includes a single control lever to move the elements of the guide means between an open position wherein the film strip can be loaded into the projector and a closed position wherein the film strip is engaged with the drive means and aligned for proper projection. The guide means includes a pair of loop forming rollers, a pair of pivotally mounted sprocket guards, an upper control pin, a biased gate rail, and a latch on the actuator for maintaining the system in either its open or closed position.

Other objects, features and advantages of the invention will be apparent from the following detailed description taken in connection with the accompanying drawings.

BRIEF DESCRIPTION OF THE DRAWINGS

FIG. 7 is a partially fragmented, rear perspective view of the actuator lever and projector lamp switch means;

FIG. 8 is a vertical section of the movable lens assembly mounting taken generally along the line 8—8 of FIG. 3;

FIG. 9 is a horizontal section of the movable lens assembly mounting taken generally along the line 9—9 of FIG. 8;

FIG. 10 is a vertical section through the feed sprocket taken generally along the line 10—10 of FIG. 3;

FIG. 11 is a vertical section, on an enlarged scale, of the feed sprocket taken generally along the line 11—11 of FIG. 10;

FIG. 12 is a vertical section, on an enlarged scale, of the takeup sprocket taken generally along the line 12—12 of FIG. 4;

FIG. 13 is a vertical section taken generally along the line 13—13 of FIG. 12.

FIG. 17 is another rear elevational view similar to FIG. 16, showing the drive means in the rapid rewind position.

DETAILED DESCRIPTION OF THE PREFERRED EMBODIMENT

Figure 1:
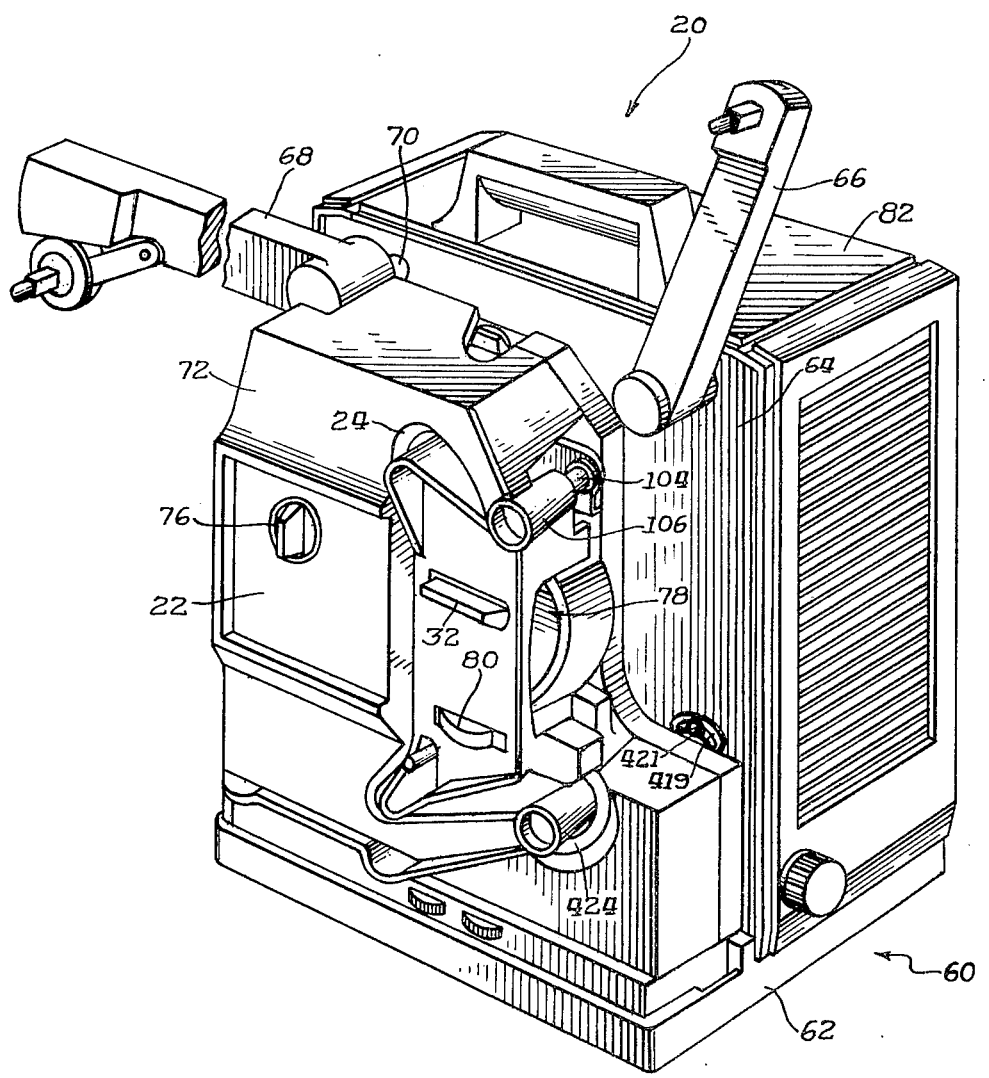
FIG. 1 is a front perspective view of the motion picture projector embodying the concepts of the present invention.
Figure 2:
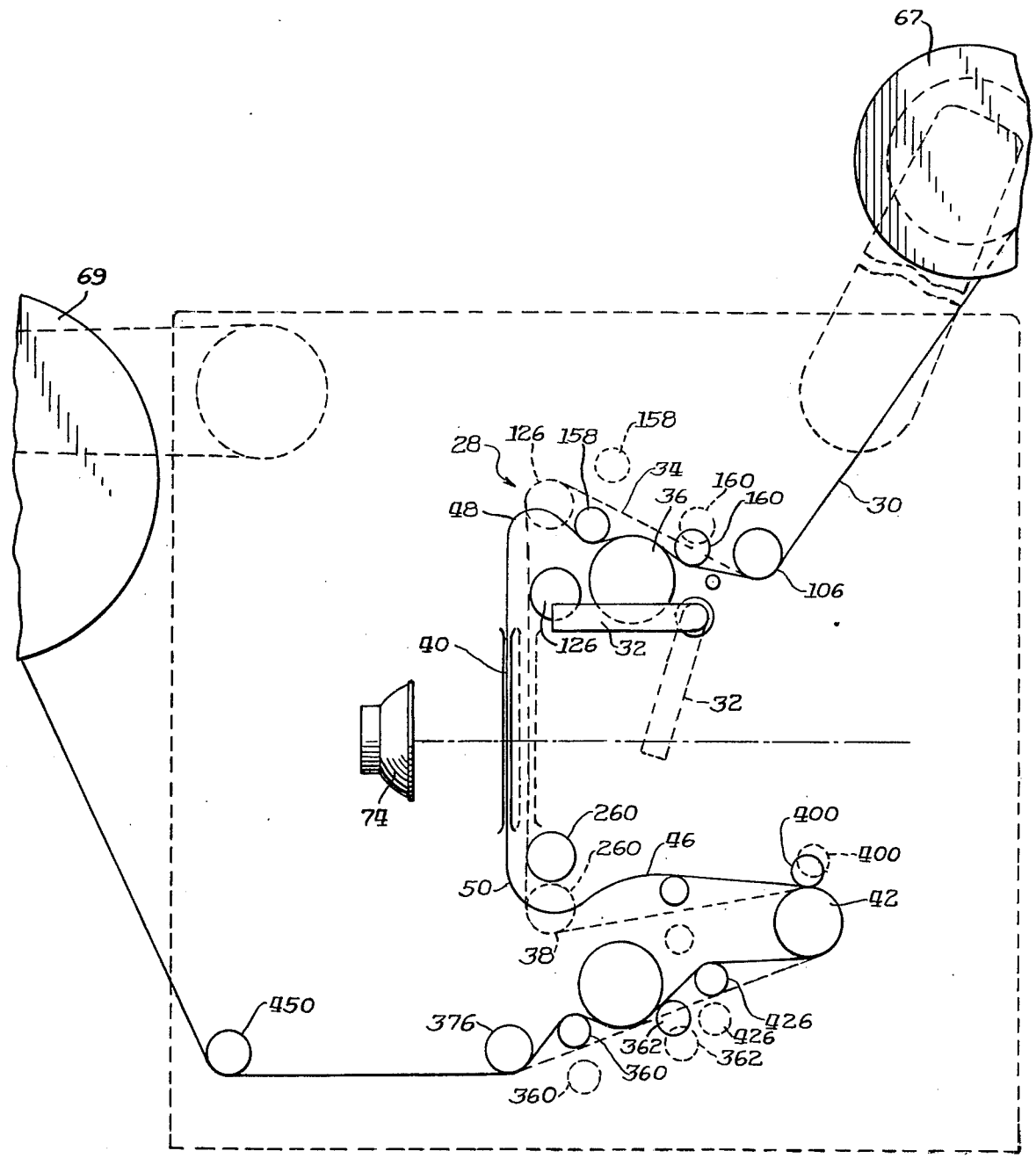
FIG. 2 is a partially, schematic front elevational view of the two film strip paths through the projector of FIG. 1.

The operation of the slot load projector of the present invention, generally designated 20, is shown best in FIGS. 1 and 2. The front 22 of the projector is provided with a film slot, generally designated 24 (FIG. 1), for edgewise loading of the film into the projector. A multiple position guide means, generally designated 28 (FIG. 2), comprises a plurality of movable elements, which will be described in greater detail hereinafter, mounted within the slot so that the leading end of a film strip 30 can be moved edgewise into the slot 24. The various elements of the multiple position guide means 28 are operated by a main control lever 32. The control lever 32 and the movable elements of the guide means 28 all are movable between a closed or run position as shown by the solid lines in FIG. 2, and an open or load position as shown by the dotted lines in FIG. 2. When loading a film strip 30, the film will generally follow the broken line path 34 as shown in FIG. 2. In this open position, the control lever 32 is in its lowermost position as represented by the dotted lines, and the film clears a feed sprocket 36, a takeup sprocket 38, an open film gate or shuttle 40, and is wrapped about a sound drum 42. Once the film strip 30 has been loaded, the control lever 32 is moved to its upper closed or run position which generally moves the film strip 30 to the solid line path 46 (FIG. 2) forming an upper and lower loop, 48 and 50, respectively, on either side of the film gate 40 and wraps the film strip 30 about the sprockets 36 and 38 for projection runs in either the forward or reverse direction.

One facet of the invention involves an improved system for operating the multiple position guide means for encapsulating the film strip. The guide means 28 can be more easily described and understood if broken down into three portions relating to (1) the upper film entry portion, generally designated 52 (FIG. 5), (2) an intermediate lens assembly guide means portion, generally designated 54 (FIGS. 8 and 9), and (3) a lower sound drum and exit portion, generally designated 56 (FIG. 6).

GENERAL DESCRIPTION OF THE PROJECTOR

Referring to FIG. 1, the slot load projector 20 of the present invention includes a generally T-shaped frame, generally designated 60, having a flat base portion 62 and an upstanding mounting flange or wall 64. The previously mentioned guide means 28 is mounted on the upstanding wall 64 to define the path of travel of the film strip. A pair of pivotally mounted foldable reel support arms 66 (for mounting the supply reel 67) and 68 (for mounting the takeup reel 69) also are mounted on the wall 64 and include detent means 70 to hold the arms 68 and 66 in their extended position, as shown in FIG. 1, for film projection. The front wall 22 includes a pivotally mounted cover 72 which covers a projection lamp 74 (FIGS. 2, 3 and 4), behind the film gate 40. A power control switch 76 is mounted for easy access to the user and permits transporting of the film in either the forward or reverse direction with or without the projection lamp illuminated. A projection lens (not shown) is mounted within the lens assembly 78 which includes a focusing knob 80 for adjusting the focus of the image. The projector 20 is provided with a removable cover (not shown) which protects the front of the projector during movement. A cavity is provided rearwardly of the wall 64 by the housing portion 82 for the drive motor, audio amplifier and other components.

MANUALLY OPERABLE ACTUATOR

Figure 5:
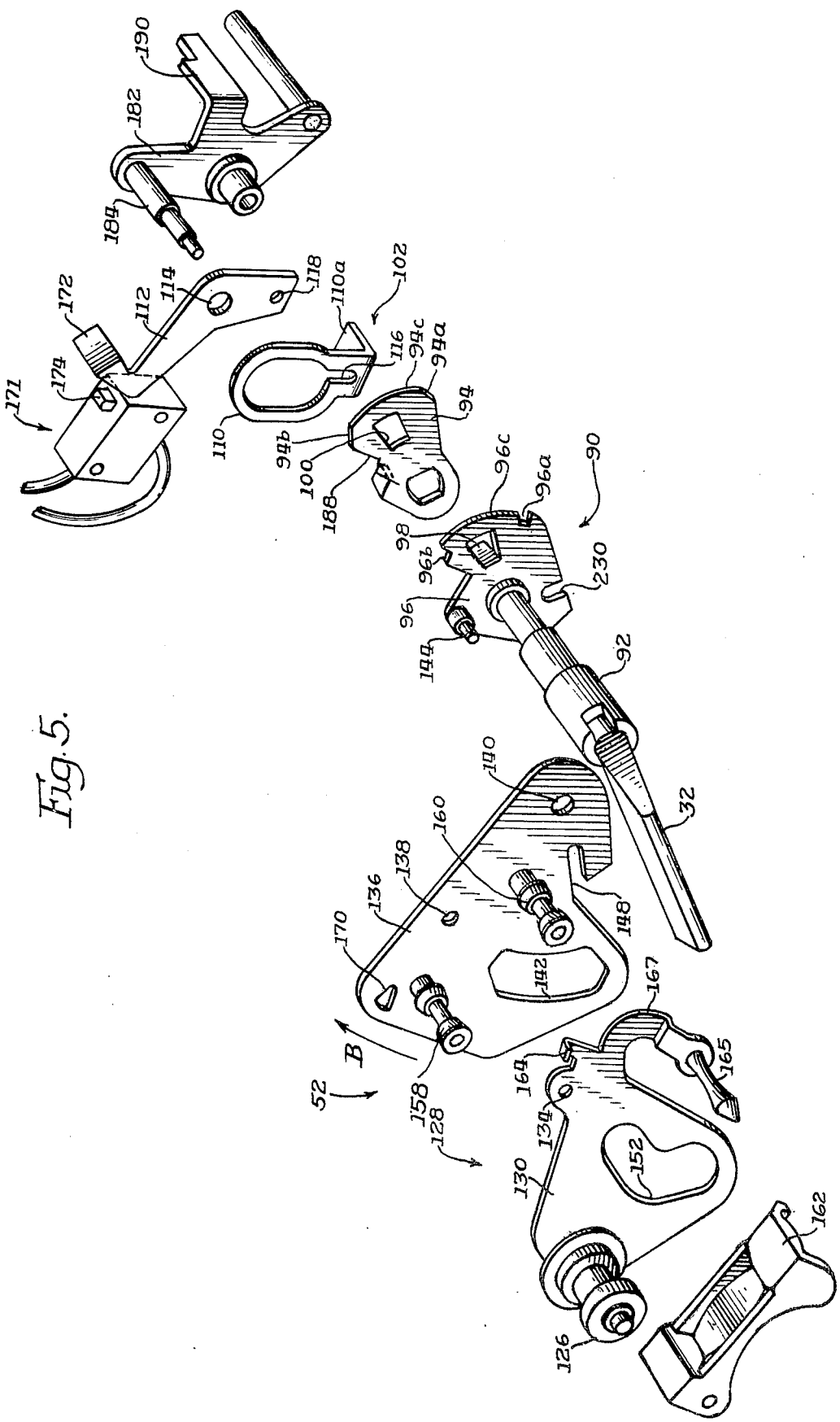
FIG. 5 is an exploded perspective view of the actuator lever and upper guide means components.
Figure 6:
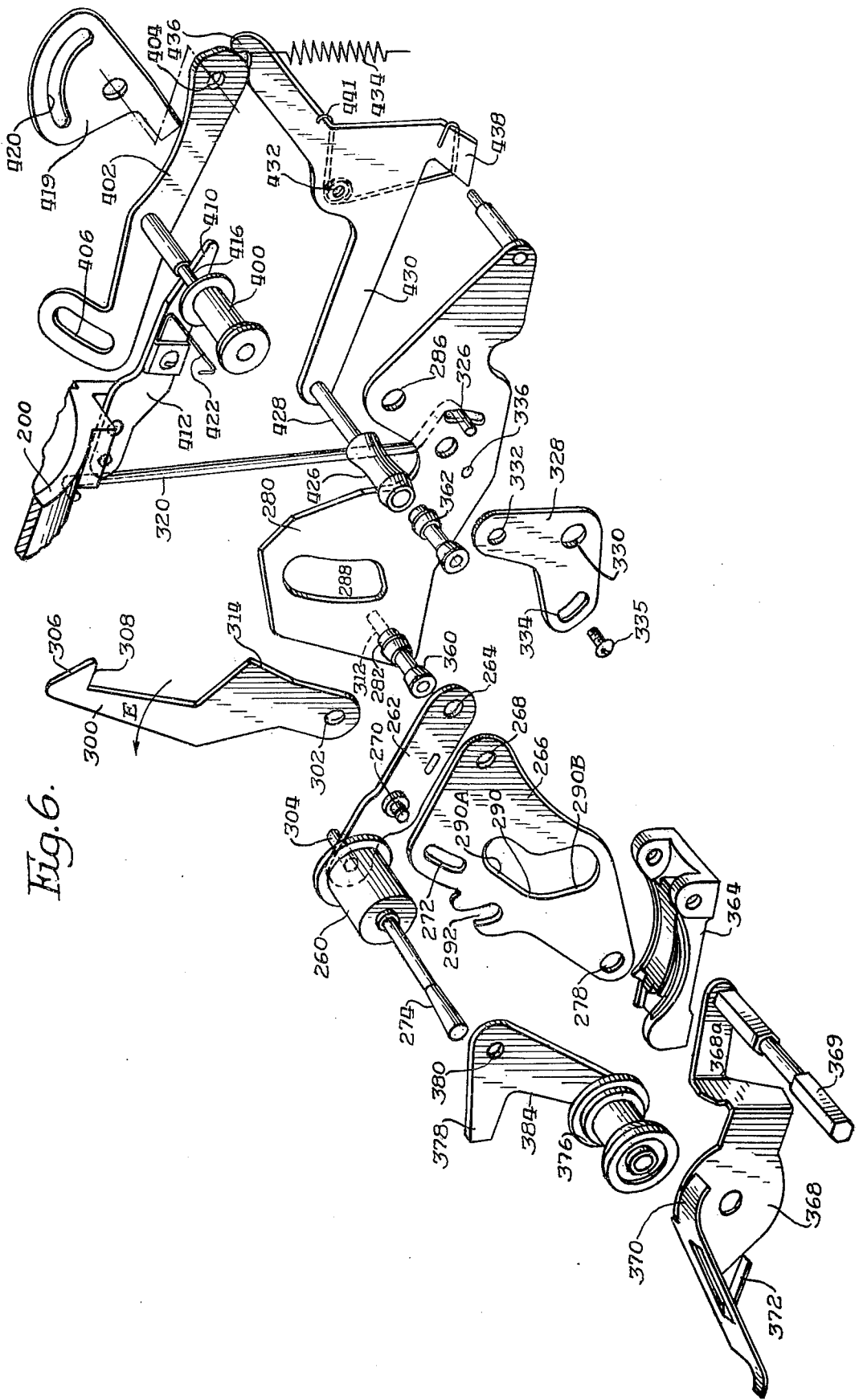
FIG. 6 is an exploded perspective view similar to FIG. 5, showing the lower movable guide means components.

The upper, film entry guide means portion 52, shown in FIG. 5, includes a manually operable actuator, generally designated 90, including the control lever 32 which is pivotally mounted by an elongated shaft 92 to the frame wall 64. A slide plate 94 is secured to the shaft 92 for conjoint rotation therewith upon manual actuation of the lever. A main actuator plate 96 is rotatably mounted on the elongated shaft 92 forwardly of the slide plate 94 but maintained in a flush relationship therewith. A rearwardly directed tab 98 is formed on the actuator plate and is passed through a notch 100 formed on the slide plate to provide a lost motion drive means for the actuator plate 96. As the lever 32 is manually rotated, the tab 98 and notch 100 form a lost motion drive means so that the slide plate 94 rotates through a predetermined arc before engagement between the notch and tab cause rotation of the actuator plate.

Latch means, generally designated 102, is provided to maintain the actuator plate 96 in either its closed or open position. More particularly, referring to FIG. 1, a first film guide roller 104 is rotatably mounted on a journal (not shown) mounted on the frame walls 64 for first contacting and guiding the film as it enters the slot. The roller 104 includes a forwardly directed tapered guide portion 106 which rotates with the roller and tends to urge the film strip rearwardly toward the roller portion 104. A latch 110 (FIG. 5) is mounted on the journal of roller 104 in conjunction with a switch actuator 112 about the hole 114 therein. A small set screw within the slot 116 of the latch is threaded into the aperture 118 in the switch actuator 112 to assure conjoint rotation therewith. A small wire spring 120 (FIGS. 3 and 4) constantly urges the latch 110 and switch actuator 112 in a clockwise direction. A rearwardly directed tab 110a on latch 110 engages the actuator plate 96 and seats in a lower latch notch 96a when the guide means 28 is in its open position or an upper latch notch 96b when the guide means 28 is in its closed position. Between these two positions, the tab 110a rides on the arcuate surface 96c of the actuator plate under the force of the biasing spring 120. Thus the latch 110 will maintain the actuator control lever 32 in either its open or closed position. The slide plate 94 includes a pair of cam surfaces 94a and 94b which, when the lever 32 is initially actuated from either position, engage the tab 110a and rotate the latch 110 in a counterclockwise direction to urge the tab 110a out of the respective notch 96a or 96b for movement of the actuator plate 96 with the slide plate 94. The lost motion drive means provided by the tab 98 and the notch 100 permit initial relative movement between the slide plate 94 and the actuator plate 96 to assure disengagement of the latch tab 110a prior to rotation of the actuator plate 96.

UPPER, FILM ENTRY GUIDE MEANS

Figure 3:
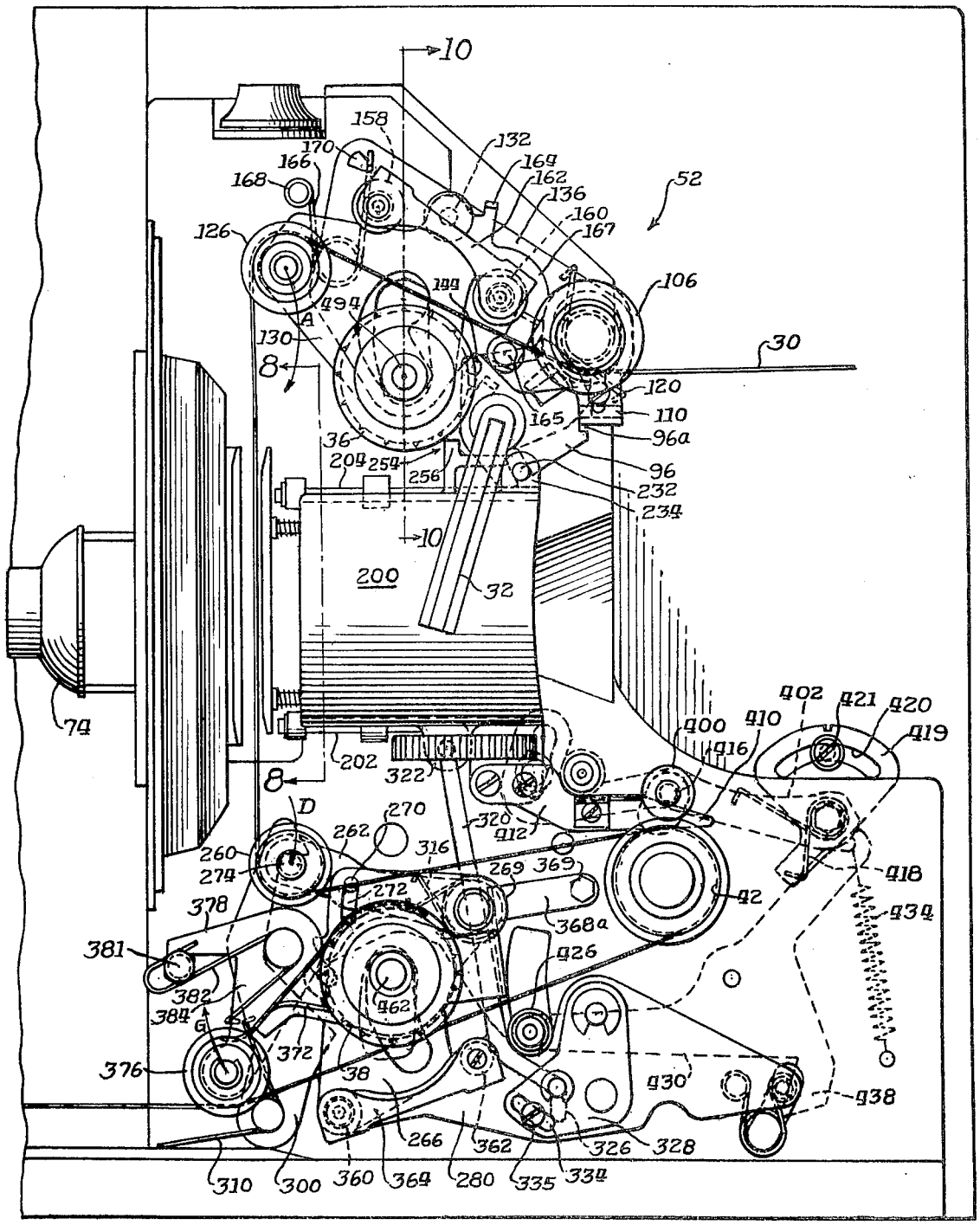
FIG. 3 is a front elevational view, on an enlarged scale, showing the actuator and film guide elements in their open or loading position.
Figure 4:
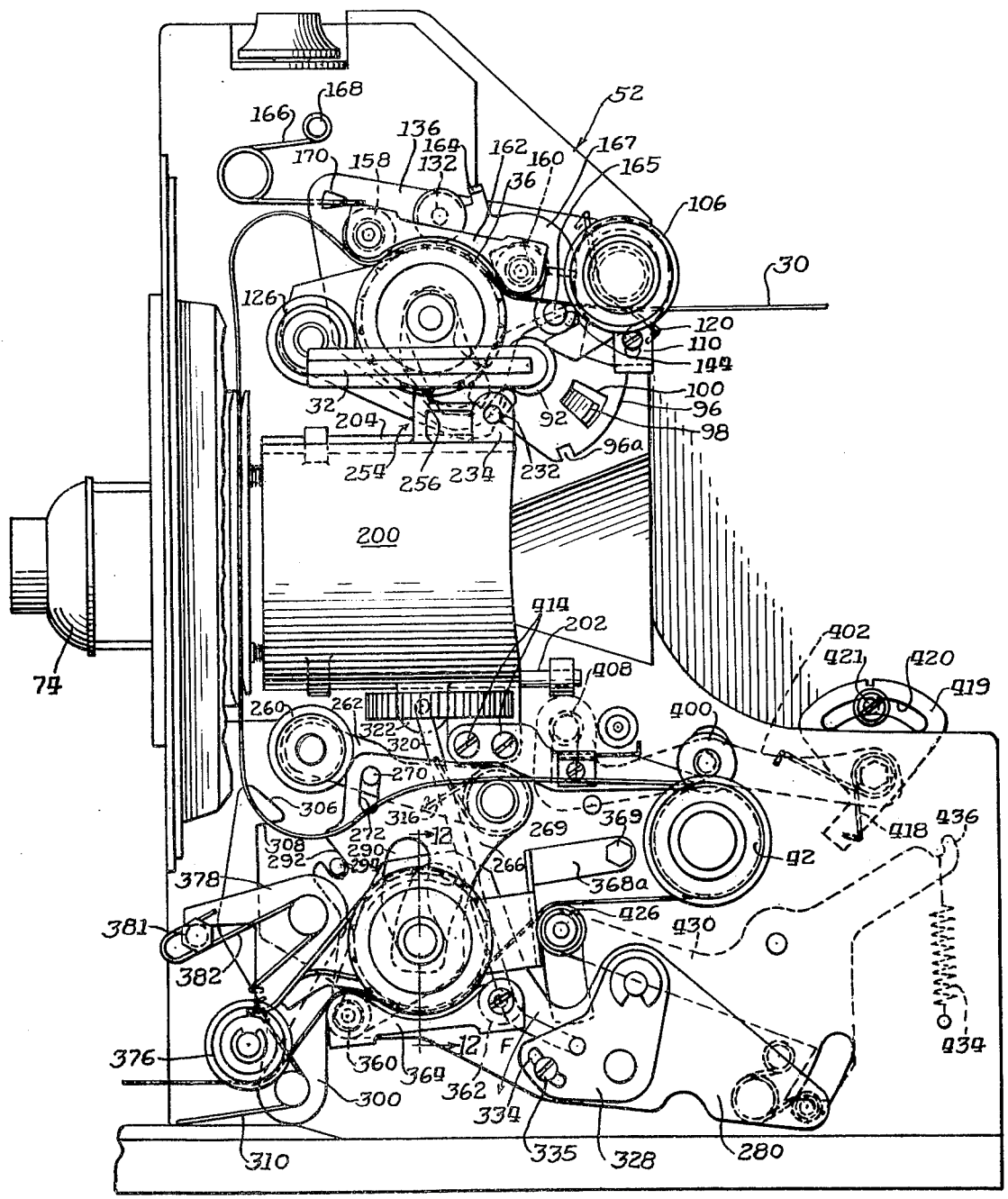
FIG. 4 is an elevational view similar to FIG. 3 showing the actuator and film guide elements in their closed or run position.

The upper film entry guide means, generally designated 52, as shown in FIG. 5, includes an upper loop forming roller 126 for forming a loop prior to the film gate 40. The conventional practice in motion picture projectors is to provide a conventional claw and ratchet mechanism, within the film shuttle to move the film in a stepwise, intermittent motion past an exposure aperture 127 so that projection of the image on the film is accomplished only when the film is in a stationary position. The projection lamp light beam is blocked by conventional means such as a propeller type vane, when the film is in motion. Therefore, since the film strip 30 moves past the exposure aperture 127 in a stepwise manner, and the film is driven by the drive and takeup sprockets 36 and 38 in a continuous motion, a loop is required to be formed both in front of and after the exposure aperture 127 and film shuttle 40 to permit some slack within the film transport. Therefore, prior to projection, and during the loading of the film strip into the slot 24 a loop must be formed on top of and below the film gate 40. The loop forming roller 126 provides this function and, prior to running of the projector, the loop forming roller 126 must be retracted away from the film to allow for the upper loop slack. The upper loop forming roller is mounted by cam means, generally designated 128, so that the roller will move in an arcuate path of travel, generally away from the film strip and then toward the film strip as indicated by arrow A in FIG. 3 when moving from its closed or run position to its open, loop forming position. This arcuate path of travel assures that film is drawn into the projector from the feed reel rather than from within the projector which might occur if the roller moved in a linear path generally in a vertical direction. The cam means 128 includes a first pivotally mounted plate 130 which is secured by a rivet 132 through the aperture 134 therein to a second pivotally mounted plate 136 through an aperture 138 therein. The second plate 136 is mounted by an aperture 140 about the axis of the roller 104 previously described. The second plate 136 includes an oversized elongated slot 142 which clears the mounting journal 150 of the feed sprocket 36 on the frame. The second plate 136 is pivoted in a clockwise direction during opening of the guide means by a drive pin 144 on the actuator plate in engagement with a cam surface 148 provided in the second plate 136. As the control lever 32 is moved from its position as shown in FIG. 4 to its position as shown in FIG. 3, the guide pin moves in a counterclockwise direction as shown between the two figures to pivot the second plate upward generally in the direction of arrow B as shown in FIG. 5. The pivotal connection between the first plate 130 and the second plate 136, i.e., the rivet 132, will rotate in an arcuate path about the pivot point 140 of the second plate 136.

The movement of the first plate 130 is controlled by an arcuate cam slot 152 formed generally in the center thereof, the surfaces of which ride directly on the journal 150 of the drive sprocket 36. Thus the movement of the plate 130 comprises both components of translation because of its connection to the second plate 136 and rotation because of the cam slot 152 engaging the sprocket journal 150. The combination of these two components thereby define the arcuate path of travel of the roller 126 as shown by arrow A in FIG. 3 and likewise, during closing of the guide means 28, in a direction opposite that of arrow A.

In addition to the loop forming function, the upper film entry guide means 52 wraps the film strip 30 about the feed sprocket 36 for positive feed of the film. More particularly, referring again to FIG. 5, a pair of rollers 158 and 160 are provided on the pivotal plate 136 for engaging the top of the film strip and wrapping it about the top portion of the feed sprocket 36 (as shown in FIGS. 2 and 4) when the guide means 28 and control lever 32 are in their closed position. Both of these rollers 158 and 160 are out of engagement with the film when the guide means is in its open position as shown by FIG. 3. A sprocket guard 162 (FIG. 5) is pivotally mounted on the same rotational axis as the film roller 158 to cover the top of the sprocket. The cover 162 is pivotally mounted so that it may be manually lifted for observing if there is correct alignment of the sprocket apertures, and the cover is biased in a downward direction.

A forwardly extending tab 164 on the first pivotal plate 130 provides a stop means to limit the arc of travel of the sprocket guard 162. Additionally, a coil type spring 166 is pivotally mounted on the frame by a pin 168 and connected by a triangular aperture 170 to the second pivotal plate 136 to bias the plate in either its open or closed position.

A control pin 165 is provided on an offset dog leg extension 167 of the mounting plate 130 to prevent loss of the upper loop during closure of the multiple position guide means 28. As seen in both FIGS. 3 and 4, this control pin 165 is not in engagement with the film strip 30 while the guide means 28 is in its fully open or fully closed position. However, during the movement of the control lever 32, the control pin moves through an arcuate path upward and in engagement with the film strip and then downward again after the control lever 32 is in its open position. Likewise, during closure of the guide means 28 the control pin 165 follows this arcuate path. The control pin 165 engages the film strip 30 during an intermediate position of the guide means and flexes the film strip against the bottom portion of the guide rollers 160 and 104 to prevent movement of the slack film, formed by the upper loop forming roller 126 out of the projector prior to engagement of the sprocket with the perforations in the film strip. It has been found that unless a provision of this type is made, it is possible that the natural flexing of the film strip itself can cause the upper formed loop to be lost as the loop forming roller moves away from the film strip and the sprocket wrapping rollers 158 and 160 engage the film strip during closure of the actuator and guide means 28.

A first pushbutton type switch means 171 is mounted on the frame wall 64 adjacent the switch actuator 112. The switch means 171 is connected in series with the projection lamp 74 and a drive motor and an audio amplifier (to be described hereinafter) so that when actuated, all power to the projector is shut down. The switch actuator 112 includes a rearwardly directed tab portion 172 on the end thereof which engages the button 174 on the switch means when the actuator 112 is pivoted about its mounting. The pivoting of the switch actuator 112 occurs during movement of the latch element 110 as the cam surfaces 94a and 94b engage the tab 110a. Thus, the actuator 112 and the switch 171 will cut out all power to the projector when the tab 110a is riding on a guide surface 94c of the slide plate 94. Therefore, the only time these elements can operate is when the tab 110a is fitted in either of the notches 96a or 96b on the actuator plate. This safety feature assures that the drive means is not operating during operation of the manually actuatable control lever 32 to prevent any damage which might occur to the film strip.

Additionally, referring to FIG. 7, a second switch means 180 is mounted on the rearward side of the frame wall 64 to maintain the audio amplifier and particularly the projection lamp 74 in the off position when the actuator and guide means 28 are in their open position.

A second switch actuator 182 is rotatably mounted to the rearward end of the control lever shaft 92 and has a drive pin 184 extending forwardly therefrom through an aperture 186 in the housing for engagement with a flat 188 provided on the generally upward edge of the slide plate 94. The second switch actuator 182 includes a rearwardly directed tab 190 (FIGS. 7 and 10) which engages a vertically movable switch button 192 and the plate 182 is pivoted. The switch button 192 is biased in a downward direction and the switch is connected to the projector lamp and audio system so that, when actuated by the tab 190, the projector lamp and audio system will be without power. As the control lever 32 is moved from its closed position to its open position, the slide plate 94, and particularly the flat 188, engages the drive pin 184 to pivot the switch actuator plate 182 in a direction as shown by arrow C, which causes the tab 190 to pivot upwardly and engage the switch button 192 and move it to the off position. Note, that with the switch in this up position as described above, the projector lamp and audio system will remain off. This is important since the first switch 171 which was depressed while the tab 110a engaged the surface 94c, will be released as the tab 110a engages the notch 96b. Therefore, the motor will begin running and the second switch means 180 will maintain the projector lamp and the audio system in an off position. This is important since disconnection of the film strip 30 with the drive sprockets will prermit the film to stop, and if the projector lamp was illuminated while the film was stopped, it would soon burn or otherwise damage the film. When the control lever 32 is moved to the open position, a rearwardly directed shaft 195 (FIG. 7) disengages the drive means as discussed in detail hereinafter.

INTERMEDIATE LENS ASSEMBLY GUIDE MEANS

The intermediate lens assembly guide means portion 54 of the multiple position guide means 28 is shown in FIGS. 8 and 9 after a conventional lens unit has been removed for clarity. The lens mounting assembly 78 comprises a tubular lens mount 200 which is mounted for reciprocal, generally horizontal movement on a pair of slide rails 202 and 204 (FIGS. 3 and 4) mounted on the frame wall 64. The lens assembly is positioned directly in front of the projection lamp 74 and film gate 40 formed in a forwardly directed mounting flange 206 on the frame wall 64. A pair of film guide rails are provided on the flange 206 for horizontally aligning the film strip 30 with respect to the film gate 40 and aperture 127. The film gate includes a backing plate 208 which precisely defines the film gate, and a forward stationary film guide rail 210 is mounted to the front of the plate 208. A rear movable film guide rail 212 is mounted opposite the rail 210 for horizontal movement toward and away from the front rail 210. Movement of the rear guide rail 212 is designed to facilitate proper alignment of the film strip 30 between the guide rails during closure of the multiple position guide means 28. As shown in the fragmentary view in FIG. 8, the rear film guide rail 212 is biased toward the front guide rail by a leaf spring 214 mounted in engagement with a stationary pin 216 on the flange 206. The movable film guide rail 212 includes a pair of double tapered drive pins 220 which are secured thereto and emerge through slots provided in a forwardly mounted captivating plate 222 secured to the flange 206 by a pair of screws 224. As the double tapered drive pins 220 move between their closed position as shown by the solid lines in FIG. 9 and their open position as shown by the dotted lines in FIG. 9, the rear guide rail moves therewith, away from the front guide rail to provide for a space, slightly larger than the width of the film, to facilitate insertion of the film strip 30 therebetween. The movement of the drive pins 220 is accomplished during operation of the control lever 32, as described below.

As stated previously, the lens mount 200 is mounted for reciprocal movement, and the desired movement is accomplished by actuation of the control level 32. Referring to FIGS. 3, 4 and 5, the actuator plate 96 includes a downwardly directed notch 230 which engages a drive pin 232 secured to an upwardly directed ear 234 on the lens mount 200. As the control lever 32 is manually operated, the slot 230 in the actuator plate 96 moves the drive pin 232 and thus the lens assembly 78 between its two extreme positions as shown respectively in FIGS. 3 and 4. The lens mount 200 is provided with an integrally molded arcuate base portion 236 at its end adjacent the film gate. A similarly shaped, but extended arcuate cam plate 238 is mounted on the base 236 having a pair of offset, rearwardly extending tab portions 240 which move in a path of travel for contacting the drive pins 220. The cam plate 238 is secured to the base 236 by a pair of set screws 242, or the like, for reciprocal movement with the lens, so that as the lens assembly moves between its respective positions shown in FIGS. 3 and 4, the tab 240 will first engage one of the tapered surfaces of the drive pins 220 to first move them and thus the rear film guide rail 212 away from the forward guide rail 210 and then release the rear guard rail, during engagement with the converging tapered surface, so that the film guide rail will move in a forward direction under the tension of the biasing spring 214. This movement of the rear film guide rail occurs just prior to the closed position of the multiple position guide means 28 as shown in FIG. 4. A film guide shoe 244 is mounted on the cam plate 238 for reciprocal movement with the lens mount 200. The shoe 244, however, includes a lost motion means, comprising a pair of mounting pins 250 slidable within apertures on the cam plate 238 and biased away from the cam plate by a pair of coil springs 252. As the lens assembly is moved toward its closed position, the film guide shoe 244 engages the film just prior to the rearward movement of the rear guide rail 212 and forces the film against the plate 208 for proper positioning in front of the projector lamp. Continued movement of the lens assembly to the closed position as shown in FIG. 4 releases the guide rail 212 so that it can move toward the front guide rail 210 which engages the rear edge of the film strip 30 and properly aligns the film in the horizontal direction. During this continued movement, the film guide shoe 244 moves slightly relative to the cam mounting plate 238 and the forces of the biasing springs 252 urge the shoe against the film strip.

A film stripper 254 in the form of a unitarily molded, upwardly directed protrusion 256 is provided on the top, front end of the lens mount 200 (FIGS. 3, 4, and 10). In the event of a film break, if the film begins to curl and roll on the sprocket 36, the film stripper 254 will engage the film and direct it away from the sprocket 36 to prevent damage to the pins, plates, cams, etc. of entry guide means 52.

LOWER SOUND DRUM AND EXIT GUIDE MEANS

The lower sound drum and exit guide means portion 56 is shown in FIG. 6 and in its respective positions in FIGS. 3 and 4. The lower guide means portion 56 is similar in certain respects to the upper guide means portion 52, with a number of added components for wrapping the sound drum and performing other functions. The guide means 56 includes a lower loop forming roller 260 which is rotatably mounted on a roller support arm 262. The roller support arm 262 is pivoted by aperture 264 to the rearward side of a first pivotally mounted plate 266 through aperture 268 therein. An idler roller 269 is rotatably mounted in the aperture 268 (FIGS. 3 and 4). A forwardly directed pin 270 on the roller mounting arm 262 extends through an arcuate slot 272 within the first movable plate 266 to provide a lost motion means between the two elements and also to limit the arcuate travel of the roller 260 with respect to the plate 266. A forwardly extending manual control pin 274 along the axis of the roller 260 permits manual movement of the roller with respect to the plate 266, as will be described in detail hereinafter. The first plate 266 is pivotally mounted by an aperture 278 to a second pivotal plate 280 through an aperture 282 therein. The second pivotal mounting plate is pivotally mounted by an aperture 286 to a mounting journal provided on the frame wall 64 (FIGS. 3 and 4).

The mounting plate 280 carries a central cutout 288 for clearing the mounting journal of the takeup sprocket 38 similar to the aperture 142. The first pivotal plate 266 includes an arcuate cam surface 290. The portion 290A rides on the journal of the takeup sprocket to control and determine the arcuate path of travel of the lower loop forming roller 260. To reduce the amount of friction between the cam means surfaces of the slot 290, an additional cam surface or notch 292 is provided near the upper surface of the plate 266 for engaging a pin 294 (shown in FIGS. 3 and 4) to initiate the arcuate path of travel of the mounting plate 266 which, after the notch 292 moves away from the pin, is continued by the arcuate surface of the cam slot 290. The portion 290b clears the journal of the sprocket while the notch 292 engages the pin 294. In this manner, the lower loop forming roller 260 will move in an arcuate path of travel as shown by arrow D during opening of the guide means, and opposite that of arrow D except as restrained by latch 300 described below, during closure of the guide means. Again, as with respect to the upper loop forming roller, the roller will first move away from the film strip and then toward the film strip so as not to ride along the film strip in a generally linear path which might cause damage to the film strip.

In order to assure proper forming of the lower loop, a latch 300 is pivotally mounted by an aperture 302 to the frame 64 for engaging a rearwardly directed pin 304 on the axis of the loop forming roller 260. As the guide means is opened, the pin 304 engages the cam surface 306 on the top of the latch 300 and slides in behind a flat 308 where it is maintained until the latch is pivoted in a counterclockwise direction as shown by arrow E to release the roller. The latch 300 is biased by a spring 310 (FIGS. 3 and 4) into engagement with the pin 304. When the guide means is moved toward its closed position, the roller 260 is mainted in its approximate open position by engagement with the latch 300 until a pin 312 (directed rearwardly from the plate 280) engages a flat 314 on the latch. This pivots the latch in the direction of arrow E, to release the roller 260. The roller support arm 262 is biased by a spring 316 (FIGS. 3 and 4) to its uppermost position with the pin 270 at the top of the slot 272.

As described previously, at any time the user may manually actuate the pin 274 to pivot the roller 260 downwardly against the film strip until the pin 270 contacts the bottom of the slot 272. This feature is provided in the event that the lower loop becomes lost during projection so that it can be manually retrieved by merely depressing the control pin 274.

The pivotal movement of the second mounting plate 280 during actuation of the control lever 32 is accomplished through a drive shaft 320 (FIGS. 6, 4 and 3) pivotally connected to a depending ear 322 formed on the lower side of the lens mounting 200. The other end of the drive shaft 320 is connected by an offset tab through an aperture 326 in the pivotal plate 280 to an adjustment plate 328 through an aperture 330 therein. The adjustment plate 328 is pivotally mounted by an aperture 332 on the same axis as the second movable plate, and by a set screw 335 through a slot 334 into a threaded hole 336 on the plate 280. Thereby, the plate 328 can be adjusted relative to the mounting plate 280 by loosening the set screw 335 and manually moving the adjusting plate 328.

As described above, when the control lever is moved, either when opening or closing the guide means 28, the lens mount 200 reciprocates in a horizontal direction, generally along the projection axis. Since the drive shaft 320 is pivotally connected to the housing 200 and the mounting plate 280, as the control lever is actuated the drive shaft 320 causes the mounting plate 280 to pivot in a counterclockwise direction, in the direction of arrow F, during opening, and in a reverse direction during closing of the guide means 28.

A similar pair of takeup sprocket wrapping rollers 360 and 362 are provided on the mounting plate 280 for wrapping the film about the takeup sprocket, as shown in FIGS. 2 and 4. Likewise, a similar arcuately molded sprocket guard 364 is pivotally mounted on the axis of the roller 362. Again, the sprocket guard 364 can be pivoted about the roller axis 362 for checking sprocket hole registration.

A sprocket shield 368 is provided to assure proper wrapping of the film strip about the takeup sprocket 38. The shield 368 mounts on the axis of the sprocket 38 and includes an upper arcuate portion 370 to prevent the lower loop from engaging the top of the sprocket, and a lower tab portion 372 to assure that the film strip properly leaves the sprocket. After leaving the takeup sprocket 38, the film is passed through a snubber roller 376 which is pivotally mounted by an arm 378 through an aperture 380 to the frame wall 64. The snubber roller bracket 378 is biased by a spring 382 against the film, as shown in FIGS. 3 and 4, but can pivot upwardly generally in the direction of arrow G until a rear flat 384 (FIG. 6) of the bracket 378 engages a mounting pin 381 (FIGS. 3 and 4). This snubber sprocket pivots upwardly to accommodate approximately one-and-a-half frames of 16mm film.

A forwardly extending hex pin 369 mounted on a rearwardly extending tab 368a of the sprocket shield 368 additionally functions as a stop for the cover 72.

Most movie projectors designed for 16mm film include an audio amplifying portion to provide audio accompaniment for the movie. The conventional audio system includes the sound drum 42 about which the film is wrapped, preferably through an arc of approximately 180°. The multiple position guide means 28 of the present invention incorporates within its lower portion means for wrapping the sound drum 42. A sound drum upper roller 400 (FIGS. 3, 4 and 6) is mounted for pivotal movement toward and away from the sound drum by a roller support arm 402 mounted on the rearward side of the frame wall 64 about an aperture 404 in one end thereof. An arcuate slot 406 in the opposite end of the arm 402 is guided by a rearwardly directed pin 408 (FIGS. 3 and 4) on the rear side of the frame wall 64. The roller 400 is raised and lowered by the engagement of a tapered end 410 of a cam arm 412 mounted to the bottom of the lens assembly 200 to reciprocate therewith. As the control lever 32 is moved to its open position (FIG. 3) the tapered end 410 engages a reduced portion 416 of the roller axis. A wire type spring 418, wrapped around the axis of aperture 404 engages the arm 402 and biases the roller into engagement with the sound drum 42. A tension adjuster 419 engages the other end of the spring 418. A slot 420 in the adjuster 419 permits variation of the spring tension as the adjuster is moved relative to a lock screw 421. A small flexible wire spring 422 is mounted to the cam arm 412 so as to be positioned directly in front of and under the roller 400 to facilitate removal of the film from between the roller and the sound drum 42 when the guide means 28 is in its open position. A second tapered roller 424 is rotatably mounted forwardly of the sound drum 42 to urge the film onto the sound drum 42 during threading.

A lower biasing roller 426 is pivotally mounted on the other side of the film drum to assure proper wrapping of the film about the sound drum 42. The biasing roller 426 is rotatably mounted by an axle 428 to a pivoted mounting arm 430 also mounted to the rear of the frame wall 64 by an aperture 432. The roller 426 is biased toward an upper direction, against the film strip 30, by a coil spring 434 secured to an extending arm 436 on the end of the mounting bracket 430. A lower depending tab 438 is provided for engagement with a rearwardly directed drive pin 440 on the mounting plate 280 so that, as the mounting plate 280 is pivoted in the direction of arrow F, the drive pin 440 will engage the tab 438 and a spring 441 to move the biasing roller 426 downward, as shown, between the relative positions of FIGS. 3 and 4. Closure of the drive means 32 permits the roller to move upwardly and engage the lower side of the film strip to assure proper wrapping of the sound drum 42. Preferably, some type of viscous damping is provided at the pivot point 432 to facilitate slow upper movement of the biasing roller 426 under the force of the spring 434. A final stationary exit roller 450 (as shown in FIG. 2) is provided on the bottommost end of the frame wall 64 to guide the film strip 30 onto a takeup reel 69.

An additional reason for wrapping a substantial portion of the sound drum is that, in conventional projectors, the sound drum is driven only by the frictional forces between the film strip and the drum itself. The film drum 42 is coaxially mounted with a large weighted flywheel (FIGS. 14 and 15) to assure constant, steady rotation of the film drum for accurate reproduction of the recorded sound on the film strip.

FILM TENSION ABSORBING SYSTEM

A film tension absorbing system is incorporated within the projector 20 and includes the lower biasing sprocket 376 (FIG. 6 discussed above), a uni-directional tension absorbing takeup sprocket 38 (FIGS. 3, 4, 12 and 13) and a bi-directional tension absorbing feed sprocket 36 (FIGS. 3, 4, 10 and 11). The pivotally mounted tension absorbing roller 376 has been discussed previously with respect to the lower guide means portion 56. The roller 376 will pivot in the direction of arrow G as the tension generated on the film strip 30 by the takeup reel 69 acts against the roller which will accommodate approximately one-and-a-half frames of 16mm film.

The takeup sprocket 38 is shown in more detail in FIGS. 12 and 13 and includes a sprocket roller portion, generally designated 460, which is mounted on a driven shaft 462. The roller portion includes a base portion 463 which provides a rear film guide flange 464, a central portion 466 and a top or forward dome-shaped portion 468 which provides a forward film edge engaging wall 470. The base 463, central portion 466 and top 468 of the sprocket 38 all are mounted on the shaft 462 for conjoint rotation therewith. A sprocket tooth disc or ring 472 (FIG. 13) is mounted between the middle portion 466 and the top 468 of the sprocket for engaging the perforations in the film and driving the film through the projector. The tooth ring portion 472, however, is mounted for a predetermined degree of relative movement with respect to the roller portion of the sprocket 460. The ring 472 includes a central aperture 474 which mounts a flat circular spacer to prevent binding of the tooth ring 472 so that it can rotate relative to the shaft.

A lost motion means, generally designated 476, is provided to control the amount of relative rotation between the tooth ring 472 and the sprocket roller portion 460. More particularly, the lost motion means 476 includes a drive pin 478 connected to the central portion 466 of the roller. The drive pin is directed forwardly through an arcuate slot 480 (FIG. 13) formed in the tooth ring 472 so that, as the pin 478 engages one end of the slot 480, the ring 472 and roller 460 rotate unitarily about the axis of the shaft 462. However, the tooth ring 472 is free to rotate relative to the roller 460 when the pin 478 is at any intermediate position of the slot 480. The ring 472 is biased by a coil spring 484 attached to the pin 478 and a slot 486 in the ring, so that the pin 478 will normally engage the end of the slot 480 as shown in FIG. 13. This is the normal drive position, since during projection of the film, the tooth sprocket 472 will rotate in a clockwise direction as shown by arrow H in FIG. 13. However, when a large tension is generated at the end of the film strip (for example, at machine startup when the takeup reel 452 winds up the slack usually accompanied during film threading), the sprocket tooth 472 will rotate at a faster rate than the drive shaft 462 and sprocket roller portion 460 against the biasing force of the spring 484. The tooth ring 472 is free to rotate until the pin engages the end of the slot 480 opposite that as shown in FIG. 13. This relative rotation between the ring portion of the tooth and the sprocket roller 460 will accommodate approximately three frames of 16mm film. Therefore, the total takeup shock absorbing system combining the pivotally mounted roller 376 and the ring 472 can accommodate approximately four-and-one-half frames.

FIGS. 10 and 11 show in more detail the elements of the bi-directional tension absorbing feed sprocket 36. The drive sprocket has a one-piece roller section 490 and an outer top portion 492 mounted for conjoint rotation with a main drive shaft 494. A similar sprocket tooth disc or ring 496 is rotatably mounted by a flat circular spacer on the shaft 494 between the roller portion 490 and the top 492. In this case, a lost motion means, generally designated 498, is provided between the roller 490 and the ring 496 so that the ring can rotate relative to the roller in two directions. The lost motion means 498 includes a drive pin 500 mounted in the roller 490 and which extends through an arcuate slot 502 in the ring 496. The end of the pin 500 is provided with a notch 504 to permit clearance for a smaller, second drive pin 508 mounted in the ring 496. A pair of arcuate leaf springs 510 and 512 are wrapped generally about the drive shaft 494 for driving the tooth ring 496. The inner spring 512 engages the top of one side of the first drive pin 500, the same side of the second drive pin 508. The outer leaf spring 510 is wrapped about the shaft 494 and engages both sides of both the first and second drive pins 500 and 508. As can be seen in FIG. 11, when operated in a forward projected position, the shaft 494 will rotate in the direction of arrow J causing the first pin 500 to engage both springs 510 and 512 to transmit the rotational force to the tooth ring 496 through the drive pin 508 to provide a substantially high, yet resilient, torque to drive the film through the projector.

When operated in a reverse direction, opposite that of arrow J, the drive pin 500 engages only the outer spring 510 thereby causing a lower torque to be applied to the tooth ring 496 through its drive pin 508. Of course, at the extreme positions, when the first drive pin 500 engages either end of the slot 502, the ring 496 will rotate conjointly with the sprocket roller 490. In the event of high film tension from the supply reel, the tension will be absorbed by the springs 510 and 512. If the film 30 becomes taut between the film gate and the sprocket, where additional film is needed, such as may occur when the guide means is moved from its closed to open position, the tooth ring 496 can rotate against the lower portion maintained by the spring 510. The yielding of this tooth ring 496 to low tension in a direction opposite that of arrow J eliminates the possibility of damaging the film perforations, particularly when operating the guide means 28.

RAPID REWIND CONTROL SYSTEM

The projector 20 also includes an automatic, selectively operable rapid rewind mode for rewinding a film strip from the takeup reel back onto the supply reel for storage. As discussed above, the takeup reel 69 and the supply reel 67 are mounted on pivotal arms 68 and 66, respectively. Each of the arms is provided with a conventional drive system internally which prevents any danger to the user which had occurred on previous belt driven projectors.

Figure 14:
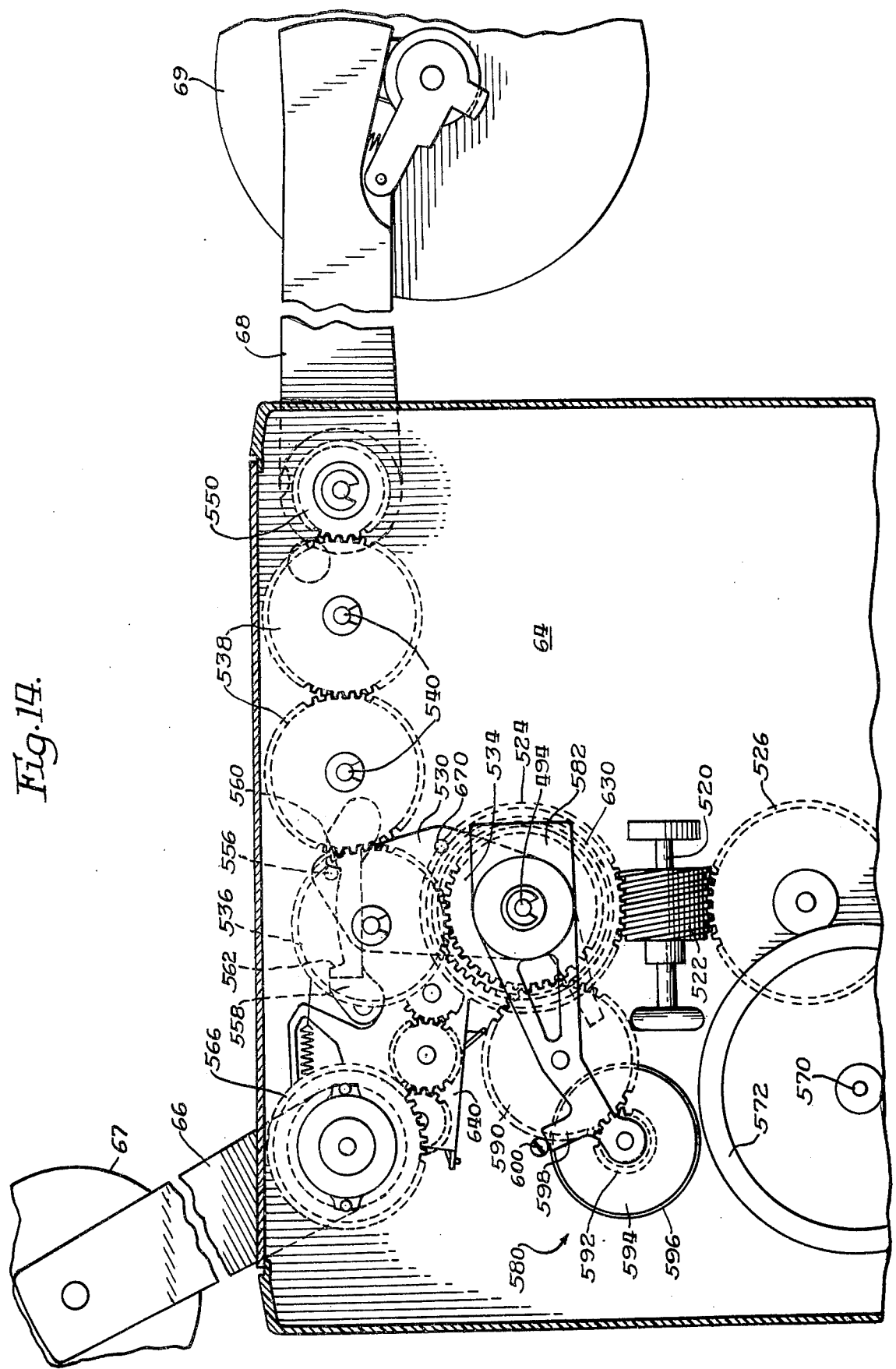
FIG. 14 is a rear elevational view of the reversible drive means for the projector shown in the forward project position.
Figure 15:
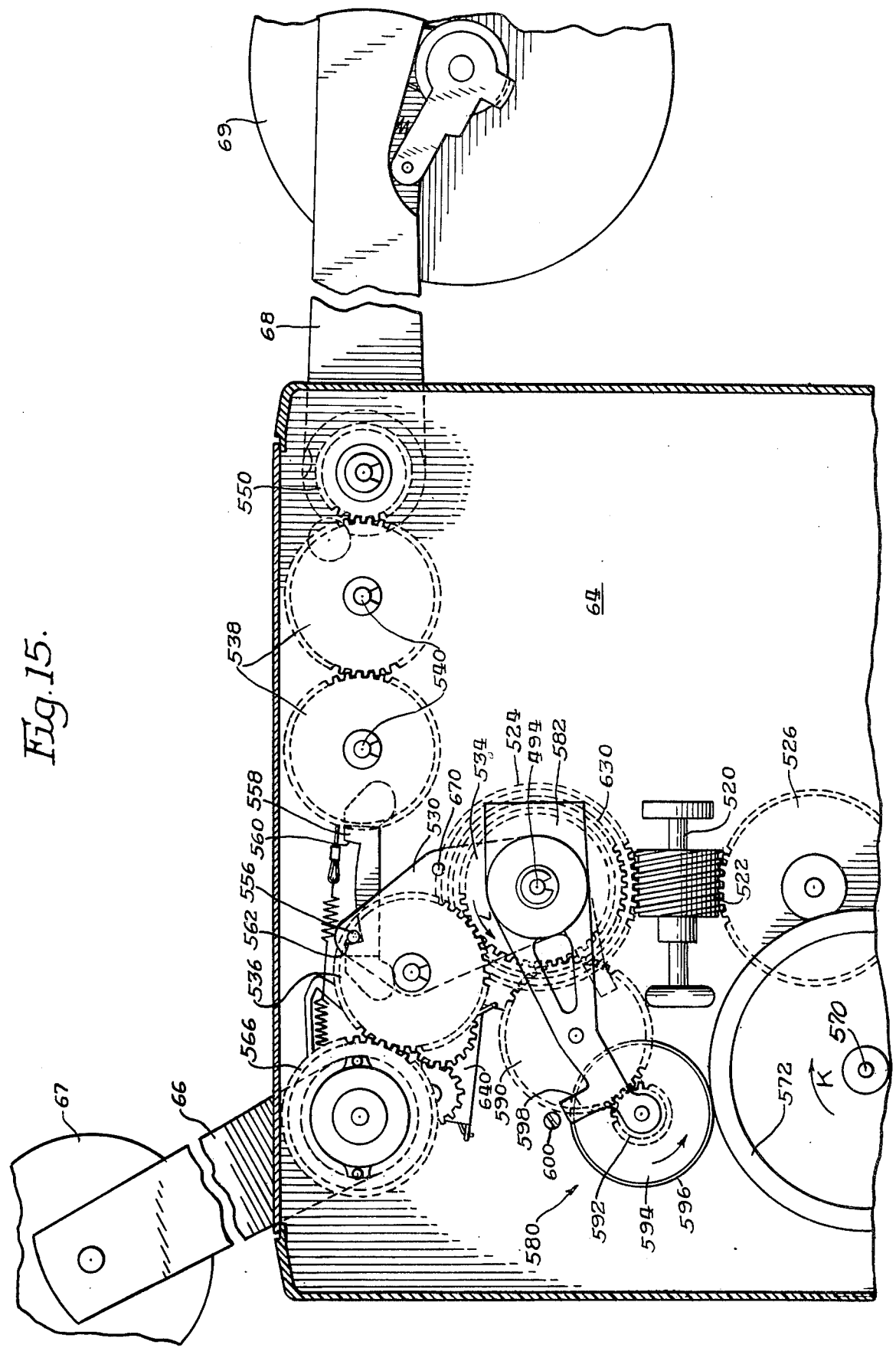
FIG. 15 is a rear elevational view similar to FIG. 14 showing the reversible drive means in the reverse project position.
Figure 16:
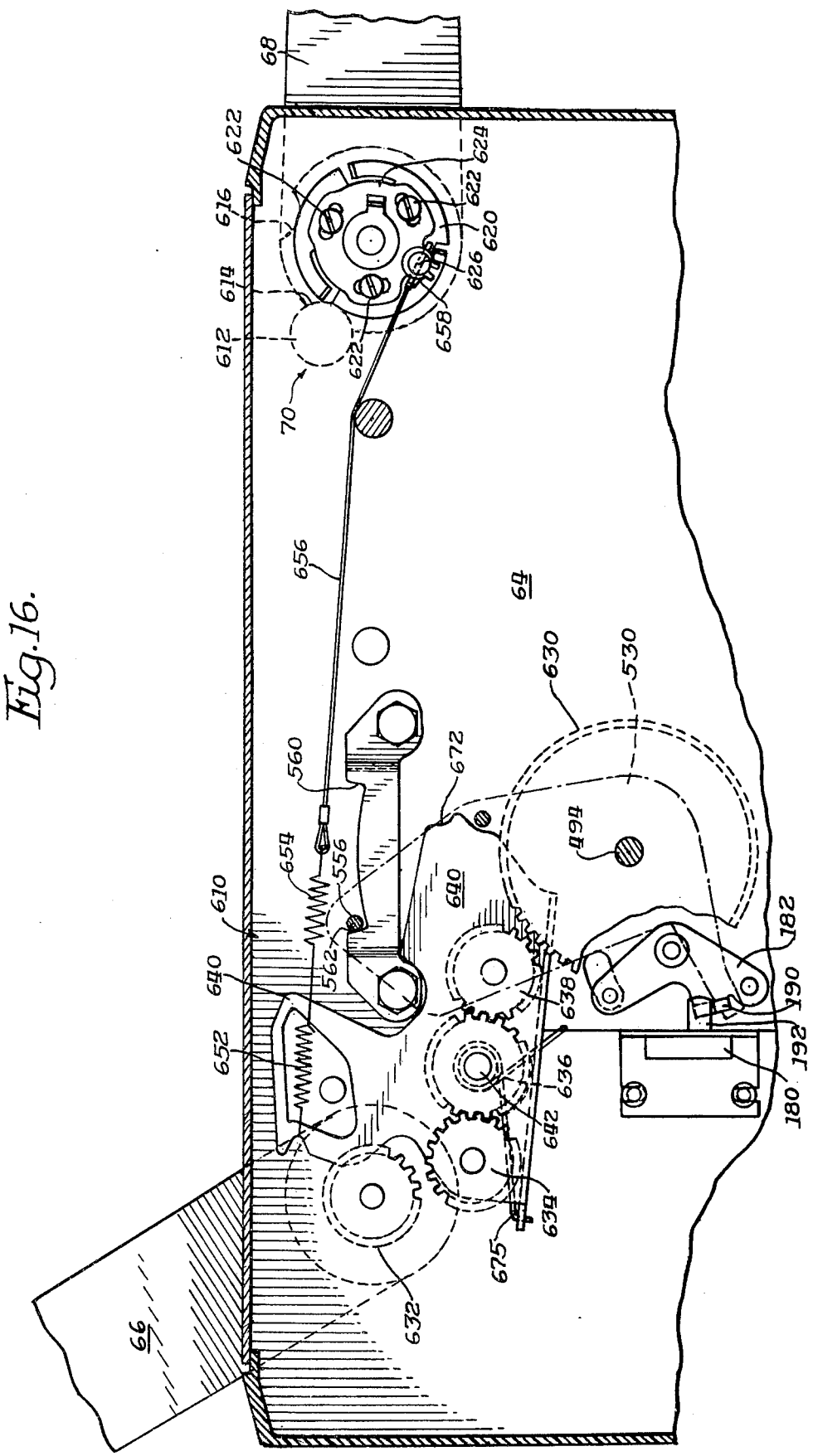
FIG. 16 is a partially fragmented, rear elevational view showing the connecting linkage for the rapid rewind mechanism.

For clarity and ease of description, the reversible drive means will be discussed with respect to its operation as shown in the drawings. FIG. 14 shows the drive means in its forward project position, FIG. 15 shows the drive means in its reverse project position, and FIGS. 16 and 17 show the respective positions of the rapid rewind mechanism which is in engagement in FIG. 17. Appropriate reference will be made to FIG. 10 which shows a general cross sectional view of the drive means and the upper feed sprocket drive shaft 494.

Referring to FIG. 14, the drive means includes a main power shaft 520 which is belt driven by a conventional electric motor which has not been shown, for clarity of the figures. The power shaft 520 drives a worm gear 522 which is in engagement with an upper main drive gear 524 and a lower main drive gear 526. The upper main drive gear 524 is mounted on the upper sprocket drive shaft 494. An intermediate gear support plate 530 is rotatably mounted on a shoulder 532 of a second, rearwardly mounted drive gear 534. A pivotal drive gear 536 is rotatably mounted on the gear support plate 530 in meshing engagement with the second drive gear 534 to transmit the power from the motor to the respective reel drives. In FIG. 14, the pivotal gear 536 is shown in engagement with a pair of idler gears 538 rotatably mounted on journal pins 540 formed in the frame plate 64. The last idler gear 538 is in mesh with a main takeup reel drive gear 550 drivingly mounted on the pivotal end of the internal takeup reel drive system. The power is therefore transmitted from the motor to the takeup reel 69 to wind the film which is exiting from the exit roller 450 of the film path.

As described above, the gear support plate 530 is mounted for relative movement on the shoulder 532 of the second drive gear 534 and includes a friction ring 554 between the shoulder and the plate, so that as the second rearwardly mounted drive gear 534 rotates in either direction, a torque will be applied to the pivotal plate 530 to rotate in the same direction. A stop pin 556 is mounted on the upper end of the pivotal plate 530 to limit the pivotal movement of the plate. Stop means in the form of an arcuately shaped bracket 558 is mounted on the rearward side of the frame wall 64 in proximity with the pin so that, as the pivotal plate 530 rotates in a clockwise direction, the pin will engage a stop surface 560 as the pivotal gear 536 meshes with the idler gear 538.

When the projector 20 is switched to a reverse project mode, the second, rearwardly mounted drive gear 534 rotates in a counterclockwise direction, carrying with it the pivotal plate 530 and thus the pivotal gear 536. The plate 530 rotates in a counterclockwise direction until the stop pin engages a second stop surface 562 whereat the pivotal gear 536 meshes with a supply reel main drive gear 566 mounted on the pivotal end of the supply reel support arm 66. The main supply reel gear 566 is drivingly connected to the internal supply reel drive within the arm 66 to rotate the supply reel 67 in a clockwise, reverse direction to roll the film strip as it exits from the top of the projector during reverse.

Thus, the shifting between forward and reverse project directions is accomplished automatically by reversing the direction of rotation of the upper drive gear 524 which causes the pivotal drive gear 536 to engage either the idler gear 538 or the supply reel drive gear 566. Both of the reel drive gears 550 and 566 are mounted by a one-way drive means similar to a ratchet drive, so that rotation of the respective gears in only one direction will rotate the respective supply or takeup reels. When the control lever 32 is moved to its open position, the gear support plate 530, by engagement of the pin 195, is moved to disengage the gears 536 and 566 to relieve film tension if the projector was last used in the reverse position prior to loading.

SOUND DRUM REVERSE DRIVE MEANS

As mentioned previously, the projector is provided with a sound drum 42 connected to an audio amplifier for use with sound accompanied movies. The sound drum is mounted on a rotatable shaft 570 extending rearwardly past the wall 64 of the housing which carries a large, generally weighted flywheel portion 572. When operated in a forward project mode, the sound drum is driven by the friction between the film strip wrapped about the drum and the surface of the drum itself and the flywheel 572 assures a smooth, continuous rotation of the sound drum. In a reverse project mode, the audio system cannot be utilized since the words would be reproduced backwards and therefore often the film drum is not necessarily rotated in a reverse direction. In the present embodiment, the takeup drive sprocket 38 is in a position along the film path rearwardly of the sound drum 42. Therefore, it would be possible, if the sound drum were not rotating properly, that the lower loop 50, below the film gate 40 could become lost.

Additionally, since there is relatively little tension generated on the film drum 42 by the film strip, since the film is feeding in a reverse direction, the film drum will not be properly rotated by the film strip. Therefore, a reverse sound drum drive means 580 (FIG. 15) is provided to rotate the sound drum in a reverse or counterclockwise direction as shown by arrow K in FIG. 15. The reverse sound drum drive means 580 includes a second, pivotal yoke 582 mounted in a rearward shoulder 584 on the second, rearwardly mounted drive gear 534 in a fashion similar to the pivotal plate 530. A rear plate 586 is secured to the drive shaft 494 by a torque ring 588 biasing the plate 586 against the pivotal yoke 582. The yoke 582 will then rotate with the rearwardly mounted drive gear 534. The rearwardly mounted drive gear 534 is in engagement with an idler gear 590 which meshes with a pinion gear 592 rotatably mounted on the end of the yoke 582. The pinion gear 592 is connected to a drive roller 594 which includes a rubber type, peripheral friction surface 596, such as an O-ring or the like.

When the projector is operated in the reverse direction, the second drive gear 534 rotates in a counterclockwise direction which urges the yoke 582 in a counterclockwise direction driving the roller 594 into engagement with the peripheral surface of the sound drum flywheel to thus rotate the flywheel in a clockwise direction. When operated in a forward direction, the drive gear 534 rotates in a clockwise direction thus rotating the yoke 582 in a clockwise direction until a tab 598 extending upwardly therefrom engages a stop pin 600 mounted on the frame wall 64. This rotation will disengage the driving relationship between the roller 594 and the flywheel 572 and thus permit the flywheel to rotate freely in a counterclockwise direction under the influence of the film friction on the sound drum.

RAPID REWIND MODE

The projector 20 of the present invention includes a rapid rewind means, generally designated 610 (FIGS. 16 and 17), to rewind the film back onto the supply reel at a much faster rate than, for example, the reverse project speed. As described in FIGS. 14 and 15, during normal projection, in either the forward or reverse direction, the takeup reel supply arm 68 is maintained in a generally horizontal direction by a detent means comprising a spring biased button 612 and an arcuate notch 614 on the arm 68. The arm 68 includes a second notch 616 which will engage the button 612 and maintain the arm 68 in a generally vertical direction as shown in FIG. 17 for rapid rewind. The arm 68 is pivotally mounted to the frame wall 64 by a flange 620 maintained thereon by a plurality of screws 622 threaded into the control arm 68. A second, rotary bracket 624 is secured to the arm 68 by the same plurality of screw 622. The bracket includes a rearwardly directed tab 626 which rotates with the bracket 624 to actuate the rewind drive means.

As described above, during reverse project, the supply reel 67 is driven by the pivotal drive gear 536 to take up the film strip. However, the rewind means 610 includes a separate gear train for rotating the supply reel at a faster, reverse rate. Referring to FIGS. 10, 16 and 17, the rapid rewind drive means comprises an intermediate drive gear 630 mounted on the drive shaft 494 between the main drive gear 524 and the rearward drive gear 534. A smaller, rapid rewind drive gear 632 is mounted forwardly of the drive gear 566 on the pivotal end of the supply reel support arm 66 in a driving relationship with the drive system therein to rotate the supply reel 67. Three idler gears 634, 636 and 638 are rotatably mounted on a cam plate 640 which is pivotally mounted to the frame wall 64 by the journal 642 of the central idler gear 636. The plate 640 is free to pivot between its disengaged position, as shown in FIG. 16, where it drives none of the elements of the projector, to the engaged position as shown in FIG. 17 where the power is transmitted through the intermediate drive gear 630, the three idler gears 634 through 638 and the rapid rewind drive gear 632 on the inner end of the support arm 66. The step down ratio between the intermediate drive gear 630 and the rapid rewind drive gear 632 causes the supply reel 67 to rotate at a much faster rate than when driven by the pivotal gear 636.

The support plate 640 is pivoted between its engaged position and its disengaged position by movement of the takeup reel mounting arm 68 from its position as shown in FIG. 16 to its position as shown in FIG. 17. The pivotal plate 640 is connected by a pair of springs 652 and 654 to a control cable 656 secured by a torque ring 658 to the actuator tab 626 on the flange 624. As the arm 68 is rotated upwardly, the tension on the cable 656 increases as the tab 626 rotates so that the biasing springs 642 and 654 elongate slightly moving the mounting plate 640 to its engaged position. When in the engaged position, a second stop pin 670 on the movable plate 530 engages a stop surface 672 on the actuator plate 640 which prevents the pivotal gear 636 from engaging the rearward drive gear 566 on the supply reel support arm 66.

Thus, by the simple movement of the takeup reel support arm from a generally horizontal position to a generally vertical position, the rapid rewind means is automatically activated to rewind the film strip. Preferably, the film strip is rewound in a straight line path between the takeup reel and the supply reel entirely outside of the projector. However, if desired, the rapid rewind mode can be utilized to rewind the film while in the projector by simple actuation of the guide means 28 to the open position.

After rewind of a particular roll of film, the takeup reel support arm is lowered to its horizontal or folded, closed position and the release of the tension on the springs 652 and 654 permit disengagement of the three idler gears 634 through 638. The idler gears are pivoted out of engagement by a biasing spring 675 wrapped around the pivotal axis 642.

The invention hereby described provides a slot load projector which is easily and conveniently loaded by the operation of a single control lever. The multiple position guide means which is actuated by the control lever 32, opens to permit proper insertion of the film edgewise into the projector through the slot, generally designated 24. The guide means elements align the film with the drive sprocket, the takeup sprocket and the sound drum while additionally forming an upper and lower loop on either side of the film shuttle or gate. Closure of the guide means automatically encapsulates the film strip within the projector in a proper position for viewing. A novel tension absorbing system is provided by the snubbing sprockets and lower pivotally mounted roller to prevent any damage to the film as when a slack portion is rapidly wound onto a supply or takeup reel. The last described rapid rewind drive means is conveniently operated by lifting the takeup reel support arm 68. This actuates the rewind drive means which will rewind the film at a much faster rate than merely reverse projecting the film through the projector.

The foregoing detailed description has been given for clearness of understanding only and no unnecessary limitations should be understood therefrom as some modifications will be obvious to those skilled in the art.

We claim:

1. In a motion picture projector having a frame, a slot for edgewise loading of the film, a feed sprocket, a takeup sprocket, a film gate and a drive means for driving the film through the projector, a multiple position guide means for engaging the film and defining the path of travel thereof, said multiple position guide means comprising:
   a manually operable actuator mounted on the frame for moving said guide means between an open position wherein a film strip can be loaded into the projector and a closed position where the film strip is engaged by said film gate and said sprockets;
   a pair of loop forming rollers, one on either side of the film gate, said rollers being movable, in response to operation of said actuator, between an open position for engaging the film and forming a loop on either side of said gate and a retracted closed position out of engagement with the film strip;
   cam means on the frame for defining the path of travel of the respective rollers; and
   means mounting the feed roller and the takeup roller for movement in an arcuate path of travel, first away from said film strip, then toward said film strip, when moving from said closed to said open positions in response to operation of the actuator, said mounting means including a first mounting plate for each roller, a cam slot in each of said first mounting plates for engagement with said cam means, and a second mounting plate pivotally mounted on the frame, said first mounting plate being pivotally mounted on said second mounting plate for translatory and rotational movement, said second mounting plates being drivingly connected to said actuator whereby the feed roller and takeup roller move in a path defined by said cam means in response to operation of the actuator.

2. The projector of claim 1 wherein the pair of loop forming rollers comprise a feed roller mounted between the feed sprocket and the film gate and a takeup roller mounted between the film gate and the takeup sprocket.

3. The projector of claim 1 wherein said actuator includes a pivotal control lever and at least one drive pin associated therewith for drivingly engaging and pivoting each of said second pivotally mounted plates.

4. The projector of claim 3 wherein the cam surface comprises a bushing provided about the rotational axis of the respective feed and takeup sprockets for engaging the cam slot in the first pivotally mounted plate.

5. In a motion picture projector having a frame, a slot for edgewise loading of the film, a feed sprocket, a takeup sprocket, a film gate and a drive means for driving the film through the projector, a multiple position guide means for engaging the film and defining the path of travel thereof, said multiple position guide means comprising:
   a manually operable actuator mounted on the frame for moving said guide means between an open position wherein a film strip can be loaded into the projector and a closed position where the film strip is engaged by said film gate and said sprockets;
   a sprocket guard adjacent each of the feed sprocket and the takeup sprocket;
   means mounting said sprocket guards for movement in response to operation of the actuator between an open position out of engagement with the sprocket and a closed position encapsulating the film strip adjacent the sprocket;
   said mounting means including a mounting plate pivotally connected to the frame and drivingly associated with the actuator for movement between said positions, each of said sprocket guards being pivotally connected to the respective mounting plates and biased against a stop means provided on the mounting plate so that the sprocket guard may be manually pivoted away from said sprocket against the force of the biasing means when the actuator is in the closed position to permit viewing of the film strip to insure proper alignment of the sprocket with the film strip perforations.

6. The projector of claim 5 wherein each of said sprocket guards includes an arcuate surface for engaging and flexing the film for contact with a plurality of teeth on said sprocket.

7. The projector of claim 5 wherein said actuator includes a pivotal control lever and a drive pin associated therewith for moving said mounting plate between the open and closed positions.

8. In a motion picture projector having a frame, a slot for edgewise loading of the film, a feed sprocket, a takeup sprocket, a film gate and a drive means for driving the film through the projector, a multiple position guide means for engaging the film and defining the path of travel thereof, said multiple position guide means comprising:
   a manually operable actuator mounted on the frame for moving said guide means between an open position wherein a film strip can be loaded into the projector and a closed position where the film strip is engaged by said film gate and said sprockets; and
   an upper control pin movably mounted adjacent said feed sprocket, said control pin being operatively associated with the actuator for reciprocal movement between a first position out of engagement with the film strip when said guide means is in the open position, and a second position also out of engagement with the film strip when said guide means is in the closed position, said pin being movable by said actuator in a path of travel defined by said guide means into engagement with the film strip intermediate said said first and second positions to move the film strip into engagement with the feed sprocket during operation of the actuator to thereby prevent longitudinal movement of the film strip out of the projector during movement of the actuator between the open and closed positions.

9. The projector of claim 8 wherein said pin is mounted by means for moving the control pin in a reciprocal path from the first position toward said film strip for engagement therewith and then away from said film strip for disengagement therewith to the second position in response to the manual operation of said actuator.

10. The projector of claim 9 wherein said mounting means includes a first pivotally mounted plate having a cam slot therein for engagement by a cam surface on the frame to define the path of travel on the control pin.

11. The projector of claim 10 wherein said first plate is pivotally secured to a second plate pivotally connected to the housing for movement, as defined by said cam surfaces as said second plate pivots in response to the operation of said actuator.

12. The projector of claim 11 including a stop pin secured to said second plate for engagement with the film strip as said control pin engages the film strip during movement of the actuator between the open and closed position to flex the film strip into engagement with the feed sprocket to prevent relative movement of the film strip with respect to said feed sprocket during operation of said actuator.

13. The projector of claim 12 wherein said manually operable actuator includes a pivotal control lever and a drive pin associated with said second plate for driving said second plate through a predetermined arc of travel as said actuator is manually operated.

14. In a motion picture projector having a frame, a slot for edgewise loading of the film, a feed sprocket, a takeup sprocket, a film gate and a drive means for driving the film through the projector, a multiple position guide means for engaging the film and defining the path of travel thereof, said multiple position guide means comprising:
 a manually operable actuator mounted on the frame for moving said guide means between an open position wherein a film strip can be loaded into the projector and a closed position where the film strip is engaged by said film gate and said sprockets;
 latch means for maintaining said actuator in the open or closed positon, said latch means comprising a manually movable control lever pivotally mounted on the frame by an axle;
 a slide plate secured to said pivotal control lever axle;
 an actuator plate rotatably mounted on said pivotal control lever axle; and
 lost motion means interconnecting said slide plate and said actuator plate permitting relative movement between said slide plate and said actuator plate during the initial movement of said control lever when operated between said open and closed positions to securely maintain said guide means in either said open position or said closed position.

15. The projector of claim 14 wherein said lost motion means comprises a slot in said slide plate and a tab formed on said actuator plate in alignment with said slot, the width of said tab being less than the length of said slot to permit lost motion therebetween for a predetermined angular rotation of said slide plate.

16. The projector of claim 15 including a latch member pivotally mounted on the frame and a pair of notches on the actuator plate for engagement with said latch member when the actuator plate is in said open or said closed positions, said latch member being biased in a direction so as to constantly urge said latch member into one of said notches.

17. The projector of claim 16 wherein said slide plate includes at least a pair of cam surfaces for engaging said latch during said lost motion travel to disengage said latch, against the force of said biasing means, from either notch on said actuator plate to permit conjoint rotation of said actuator plate with said slide plate through said lost motion drive means.

18. In a motion picture projector having a frame, a slot for edgewise loading of the film, a feed sprocket, a takeup sprocket, a film gate and a drive means for driving the film through the projector, a multiple position guide means for engaging the film and defining the path of travel thereof, said multiple position guide means comprising:
 a manually operable actuator mounted on the frame for moving said guide means between an open position wherein a film strip can be loaded into the projector and a closed position where the film strip is engaged by said film gate and said sprockets;
 a loop forming roller between said film gate and said takeup sprocket, said roller being pivotally mounted and drivingly connected to said actuator for forming a loop on the takeup side of said film gate when the actuator is moved to said open position; and
 delay-release means associated with said loop forming roller for retaining said roller in said open position for a predetermined period while said actuator is moved to the closed position to prevent the lower loop from being lost.

19. The projector of claim 18 including biasing means connected to said roller for biasing the roller to the closed position, out of engagement with said film.

20. The projector of claim 19 wherein said loop forming roller is rotatably mounted on a roller bracket, said roller bracket being pivotally mounted to a first mounting plate pivotally mounted to a second mounting plate pivotally secured to the frame, said roller mounting bracket having a pin extending through an arcuate slot provided in said first mounting plate to provide for relative pivotal movement of said mounting bracket, and thus arcuate movement of said roller with respect to said first mounting plate during manual operation of said actuator.

21. The projector of claim 20 wherein said first mounting plate is connected to said actuator and includes cam means for moving said roller in a predetermined arcuate path first away from said film strip and then toward said film strip when the actuator is operated between said open and closed positions.

22. The projector of claim 21 including latch means pivotally mounted on said housing for engaging said roller mounting bracket when the actuator is in said open position and momentarily maintaining said loop forming roller in its extended open position during a portion of the movement of said actuator toward said closed position.

23. The projector of claim 22 including release means comprising a pin mounted on said second mounting plate for contacting said latch means as said actuator approaches said closed position for contacting said latch means and permitting relative movement of said roller mounting bracket with respect to said first mounting plate.

24. The projector of claim 23 wherein said latch means is biased towards its engaged position and said roller mounting bracket is biased towards its position closest to the film gate after the forming of a loop.

25. The projector of claim 24 wherein said takeup loop forming roller includes a manually actuatable elongated extension, accessible to the user of the projector, to permit manual movement of said roller mounting bracket with respect to said first mounting plate to permit reforming of the film loop at any time, by manual actuation thereof, in the event said loop is lost by the projector.

26. In a motion picture projector having a frame, a film loading slot, and a film gate, a multiple position guide means for aligning the film with the film gate, comprising:

a manually operable actuator mounted on the frame for moving the guide means between a loading position and a projection position;

a pair of guide rails for horizontally positioning the film strip at said gate;

mounting means comprising a pair of generally horizontal slots for movably mounting one of said guide rails;

a resilient spring for biasing the movable guide rail toward the other of said guide rails; and cam means on said movable guide rail for moving said rail away from said stationary rail during movement of the guide means from said projection position to said loading position, said cam means comprising at least one pin having a convex head portion thereon and a cam follower mounted on a movable lens asssembly, whereby manual operation of the actuator permits movement of the movable guide rail into engagement with the film gate for proper alignment therewith.

27. The projector of claim 26 wherein said actuator includes a pivotal control lever and a drive pin associated with said lens assembly for moving said lens assembly in a horizontal path of travel as said control lever is manually moved between the open and closed positions.

* * * * *

UNITED STATES PATENT OFFICE
CERTIFICATE OF CORRECTION

PATENT NO. : 4,037,949
DATED : July 26, 1977
INVENTOR(S) : Vincent S. Pasturczak It is certified that error appears in the above—identified patent and that said Letters Patent are hereby corrected as shown below:

Column 19, line 22 (Claim 10, line 4), change "on" to --of--.

Column 22, Line 19 (Claim 26, line 23), after "the", insert --film strip at the--.

Signed and Sealed this

Sixth Day of February 1979

[SEAL]

Attest:

RUTH C. MASON
Attesting Officer

DONALD W. BANNER
Commissioner of Patents and Trademarks